United States Patent
Hammerschmidt et al.

(10) Patent No.: US 10,164,737 B2
(45) Date of Patent: Dec. 25, 2018

(54) SPC SENSOR INTERFACE WITH PARTIAL PARITY PROTECTION

(71) Applicant: Infineon Technologies AG, Neubiberg (DE)

(72) Inventors: Dirk Hammerschmidt, Villach (AT); Wolfgang Scherr, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/052,569

(22) Filed: Feb. 24, 2016

(65) Prior Publication Data

US 2016/0277149 A1 Sep. 22, 2016

Related U.S. Application Data

(60) Provisional application No. 62/134,925, filed on Mar. 18, 2015.

(51) Int. Cl.
| | | |
|---|---|---|
| *H04L 1/00* | (2006.01) | |
| *H04L 29/08* | (2006.01) | |
| *H04L 25/49* | (2006.01) | |
| *H04L 1/06* | (2006.01) | |

(52) U.S. Cl.
CPC ........ *H04L 1/0061* (2013.01); *H04L 25/4902* (2013.01); *H04L 67/12* (2013.01)

(58) Field of Classification Search
CPC ... H04L 1/0061; H04L 1/0063; H04L 1/0064; H04L 25/4902; H04L 67/12
See application file for complete search history.

(56) References Cited

U.S. PATENT DOCUMENTS

| | | | | |
|---|---|---|---|---|
| 4,736,377 A | * | 4/1988 | Bradley | H04J 3/14 714/703 |
| 5,068,854 A | * | 11/1991 | Chandran | H03M 13/09 714/776 |
| 6,741,794 B1 | * | 5/2004 | Sumioka | H04N 5/073 348/E5.014 |
| 2003/0192006 A1 | * | 10/2003 | Coakeley | H03M 13/098 714/776 |

(Continued)

FOREIGN PATENT DOCUMENTS

CN 104182292 A 12/2014

OTHER PUBLICATIONS

"Surface Vehicle Information Report," SAE International, SAE J2716 PropDftxxx201x. Mar. 2010. 103 pages.

*Primary Examiner* — Thien Nguyen
*Assistant Examiner* — Dipakkumar B Gandhi
(74) *Attorney, Agent, or Firm* — Eschweiler & Potashnik, LLC

(57) ABSTRACT

A sensor system is configured to communicate at least partially protected sensor data over a communication interface. The sensor system includes a sensor element and a communication interface communicatively coupled to the sensor element. The sensor element is configured to provide sensor data in the digital domain. The communication interface is configured to generate a data package for transmission over the communication interface from the sensor data. The data package includes a data grouping comprising one or more nibbles related to the sensor data. The data package further includes a nibble indicia based on at least a portion of selected nibbles within the data grouping.

15 Claims, 20 Drawing Sheets

(56) References Cited

U.S. PATENT DOCUMENTS

2009/0201123 A1* 8/2009 Kafry ................... E03F 5/042
340/3.32
2015/0074404 A1* 3/2015 Kasper ................. H04L 63/08
713/170

* cited by examiner

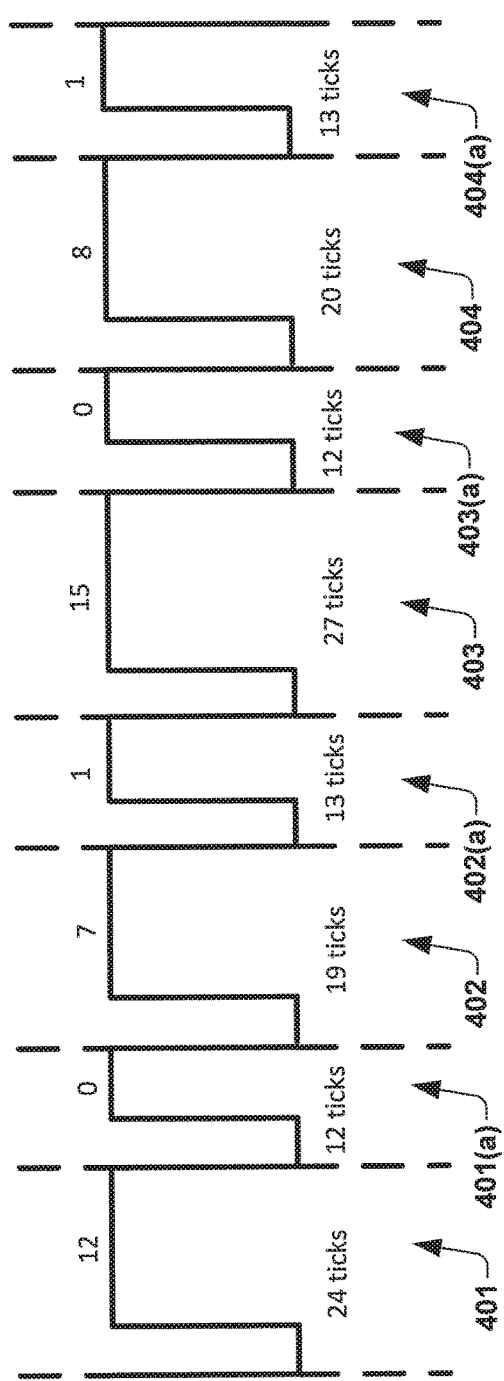
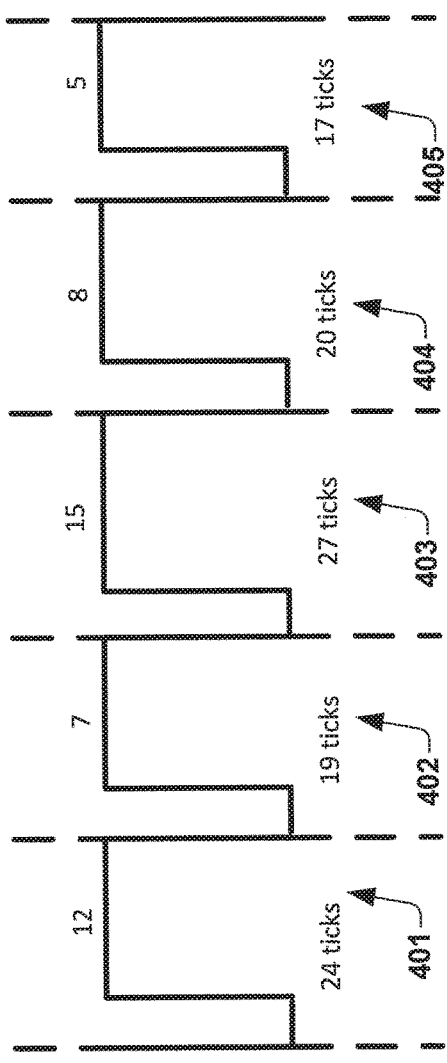

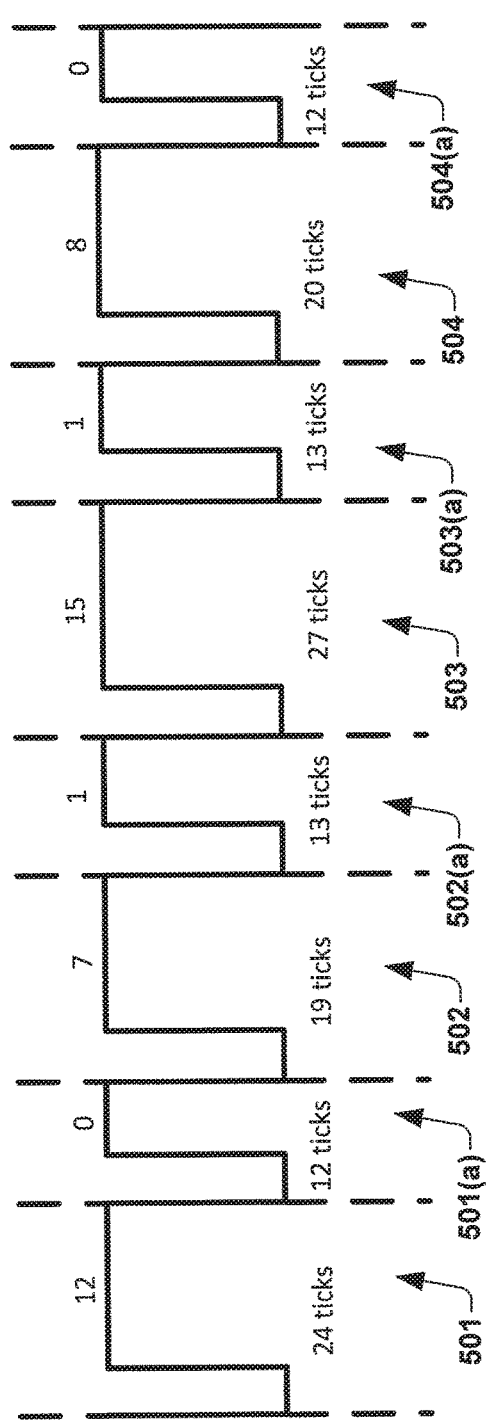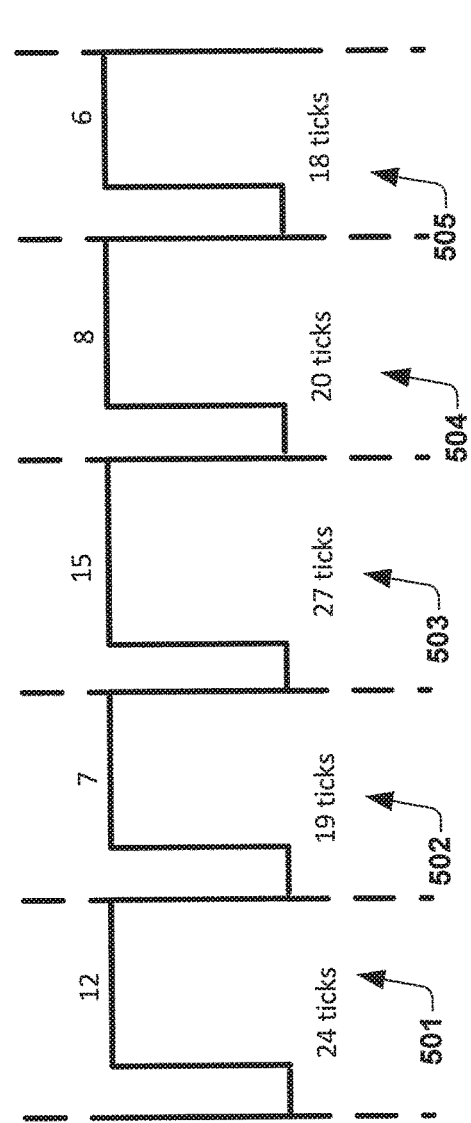
Fig. 5A
Fig. 5B

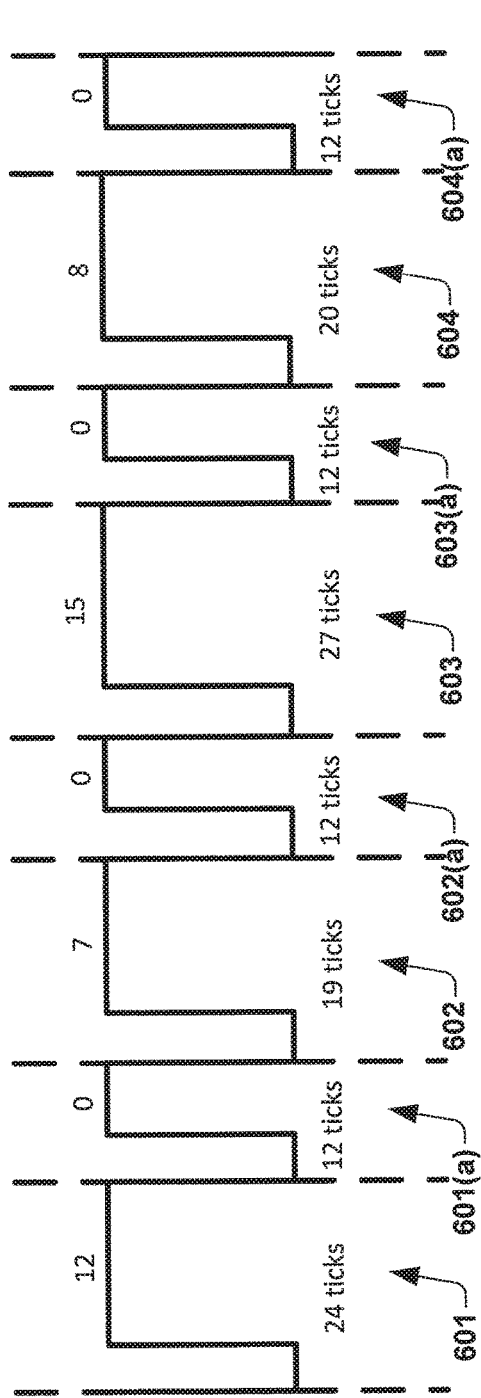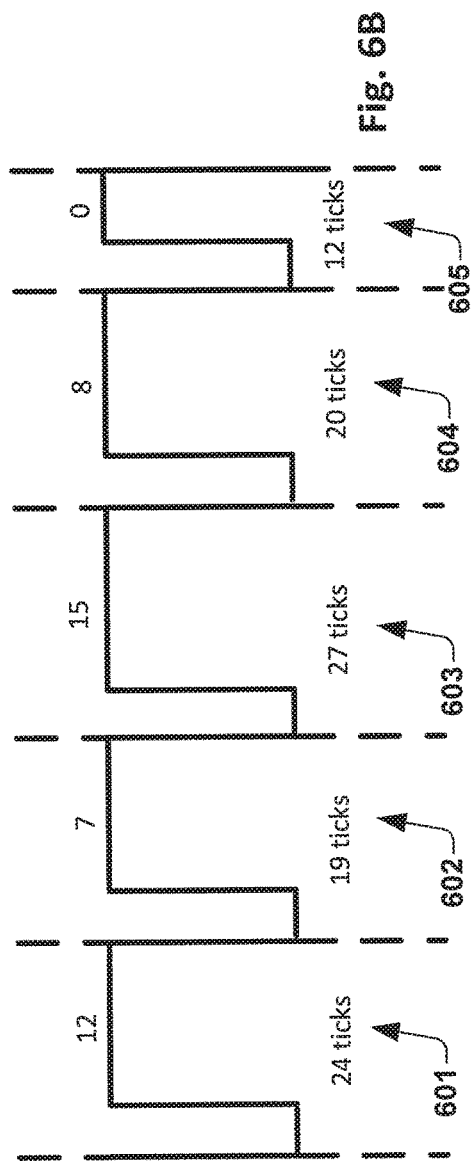

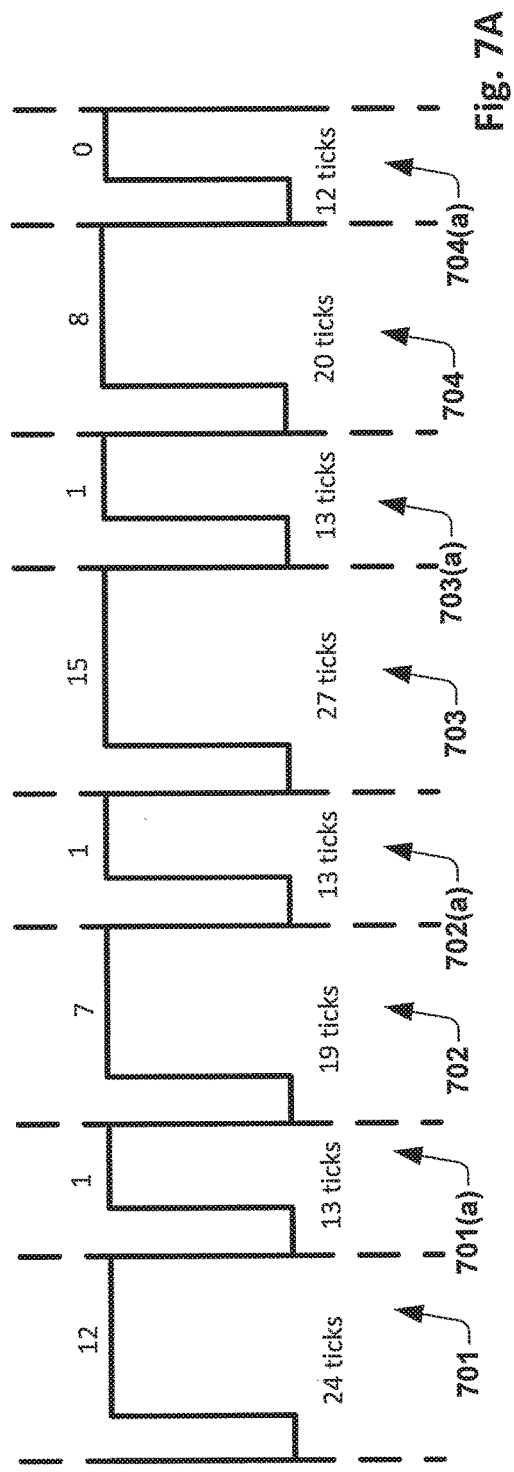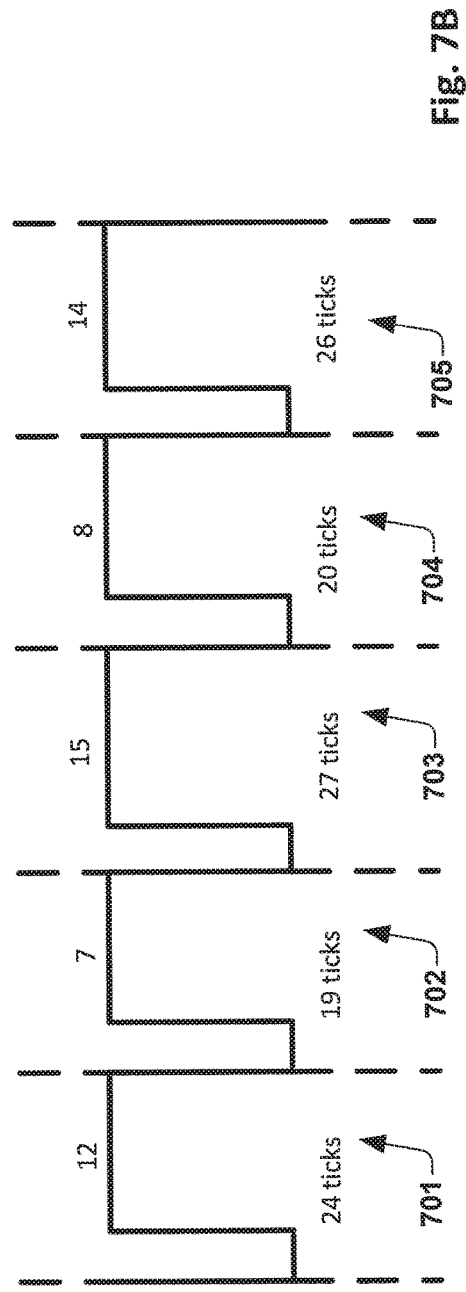

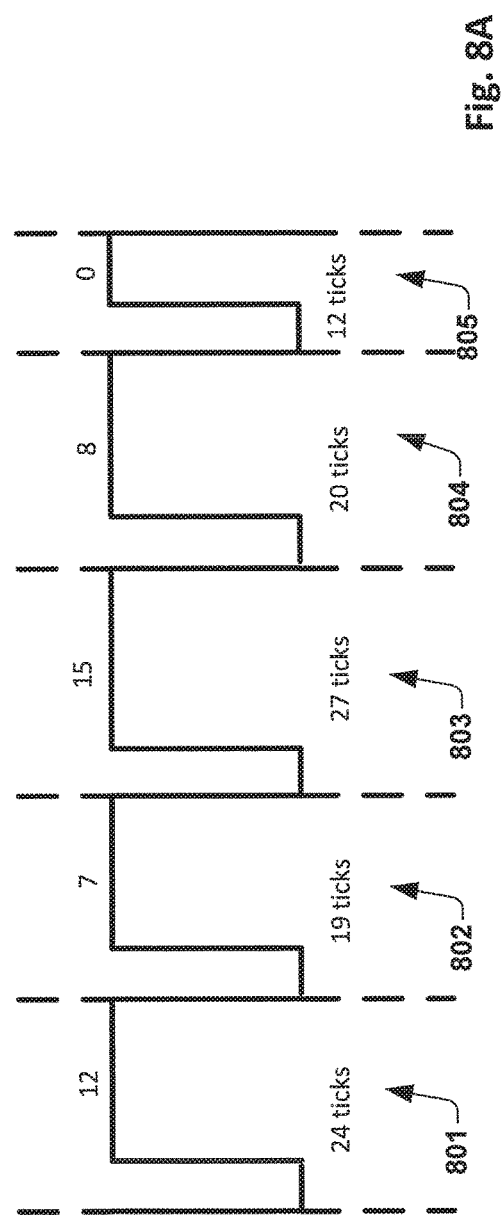
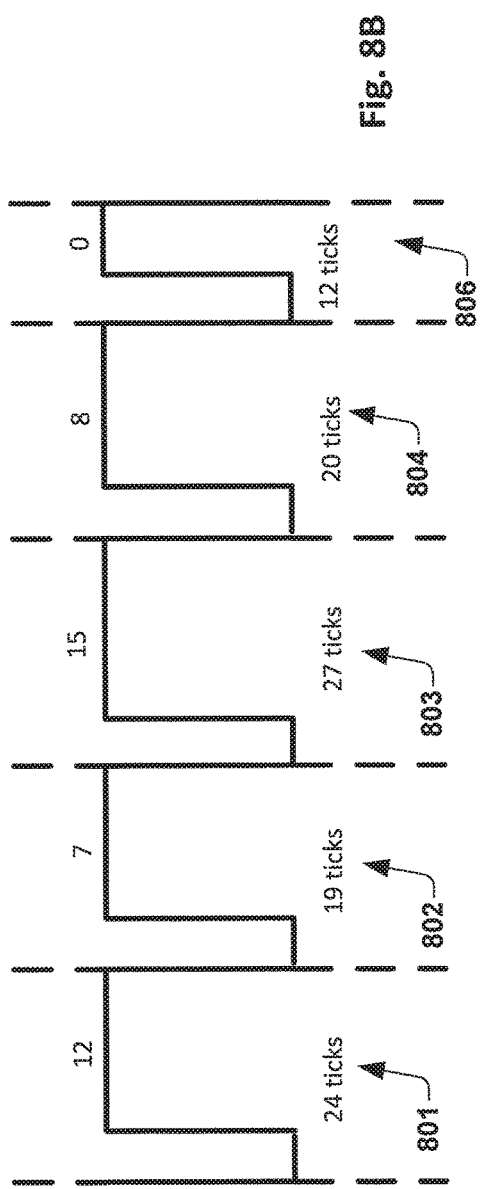

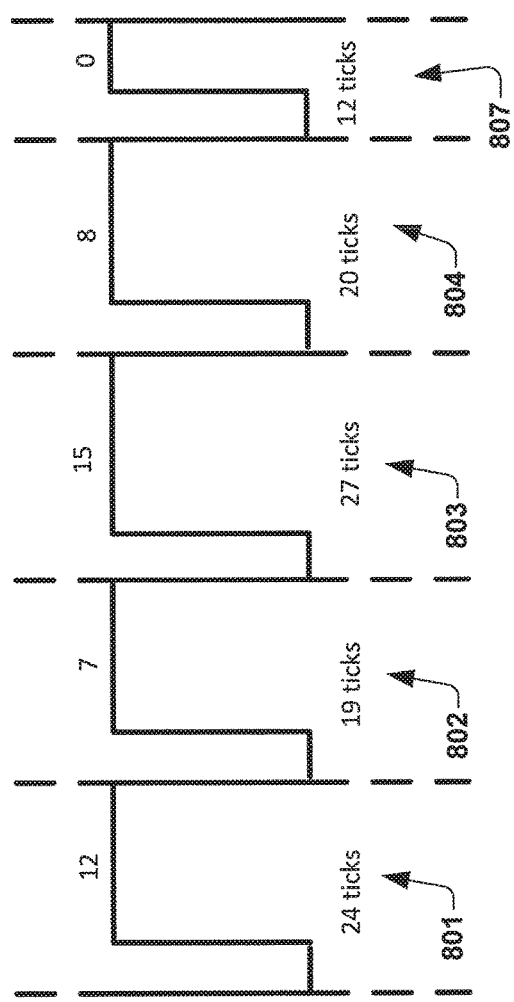
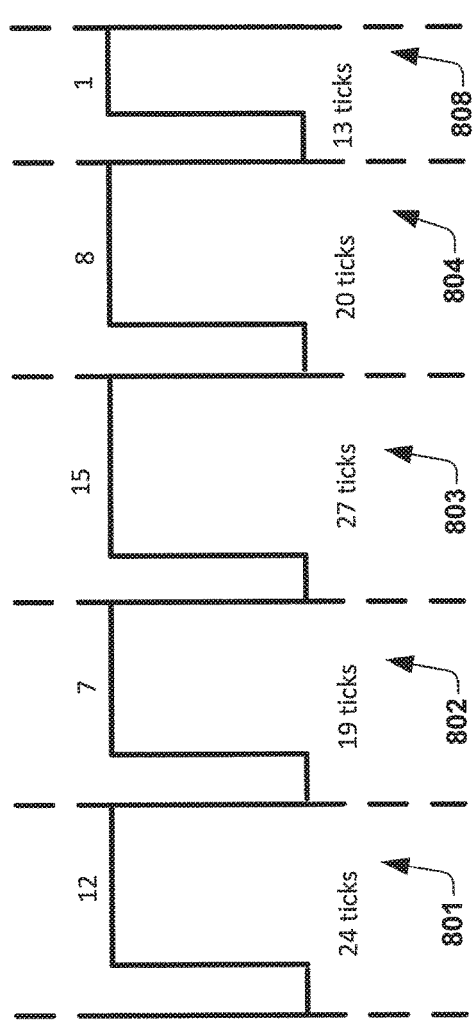

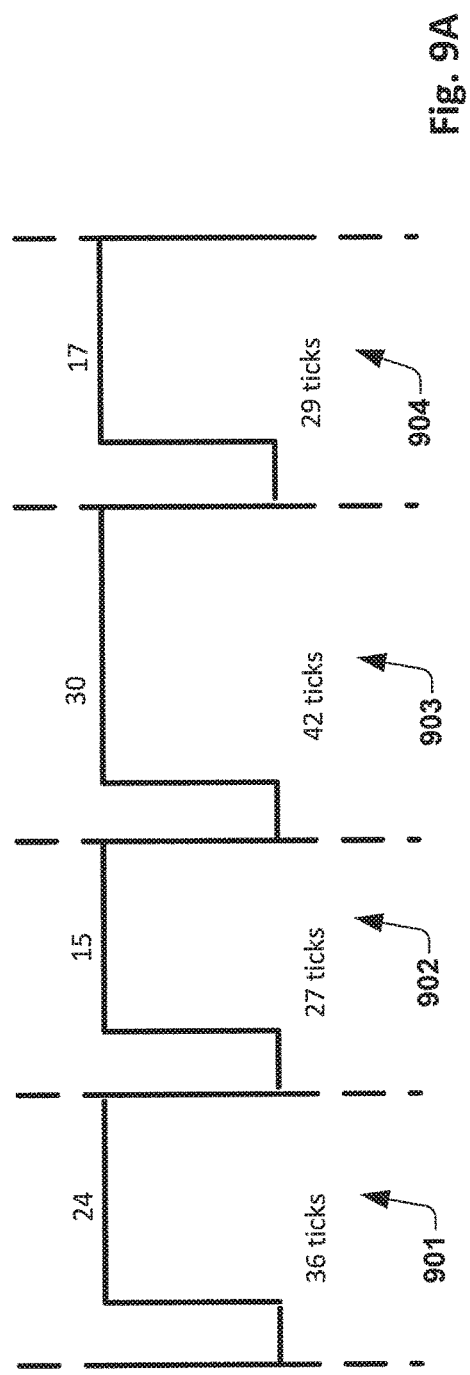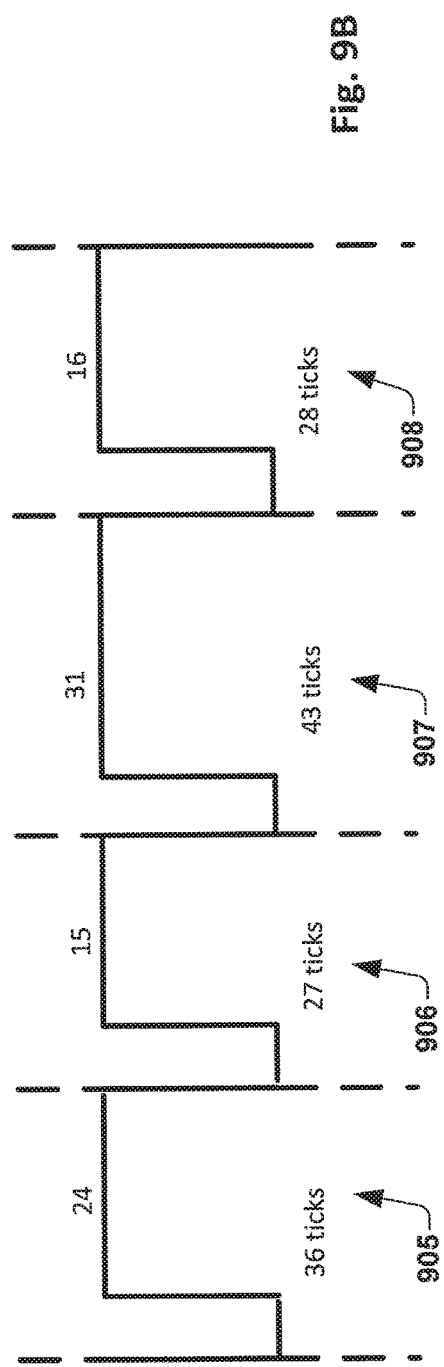

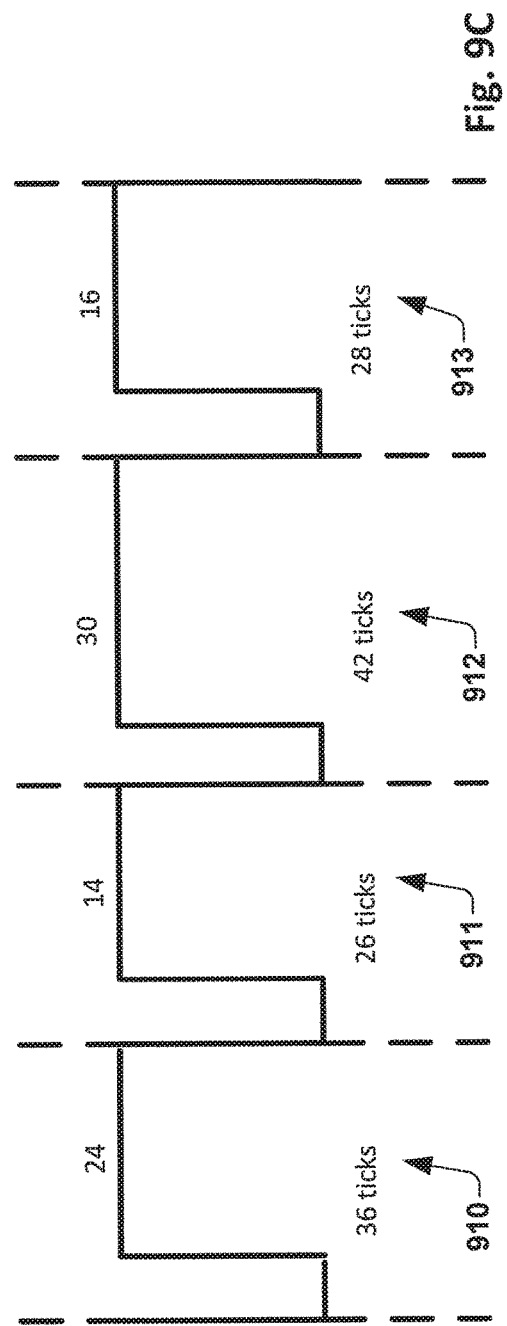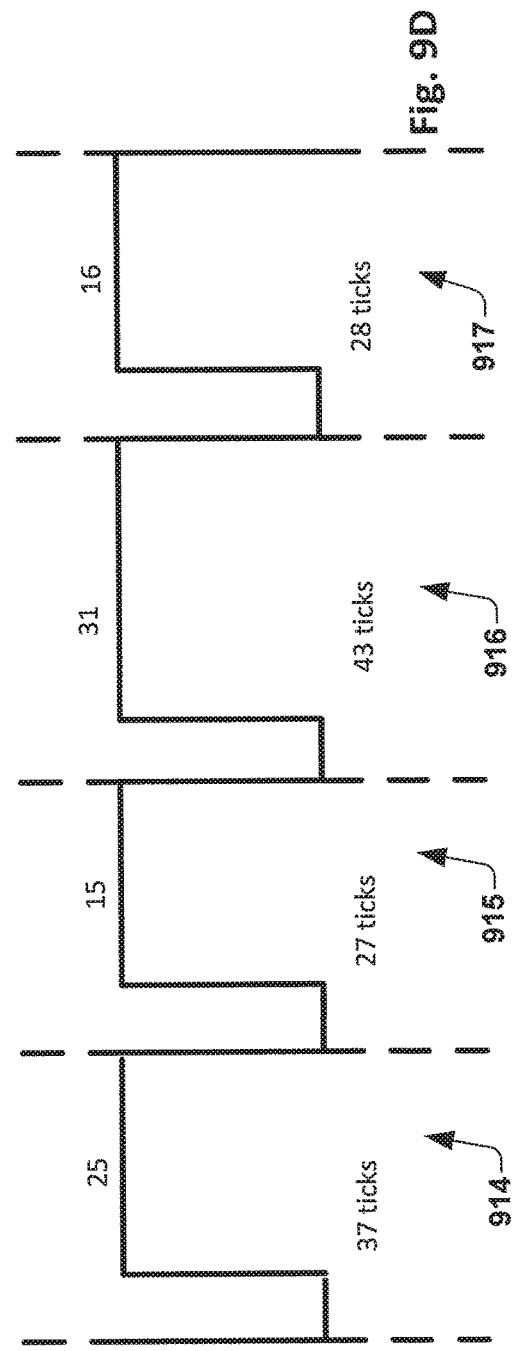

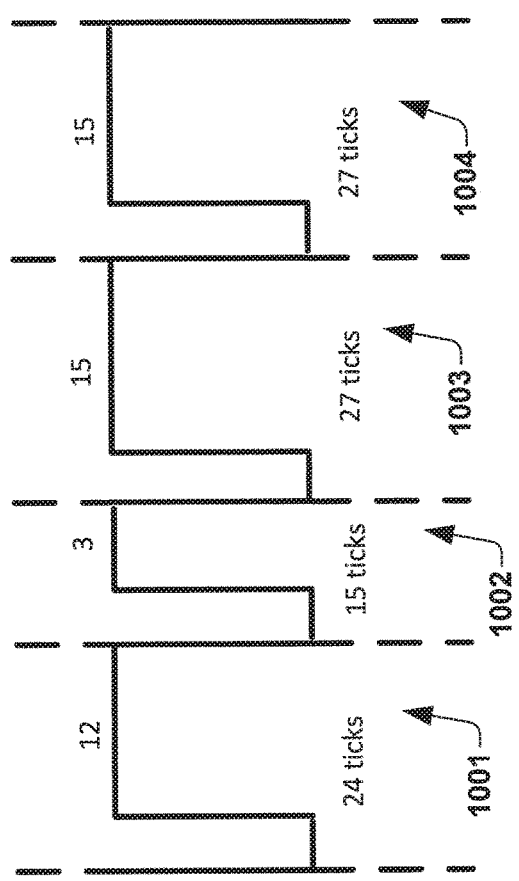
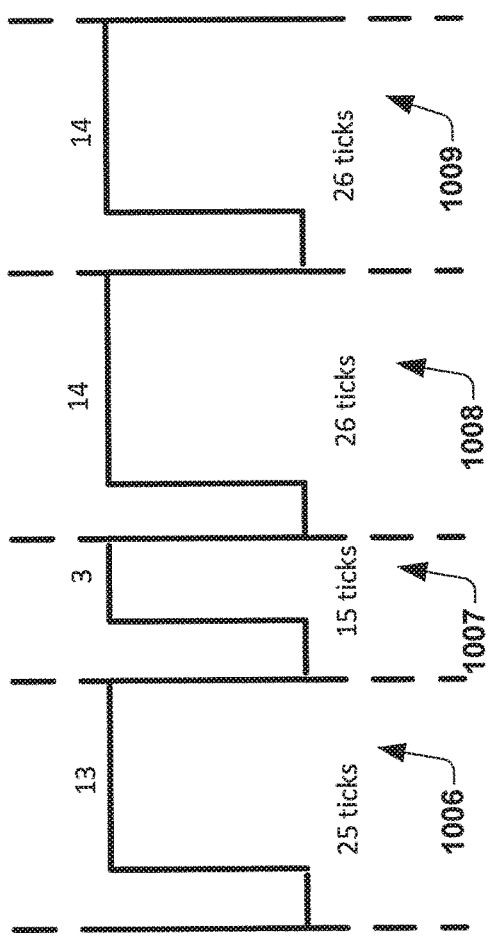

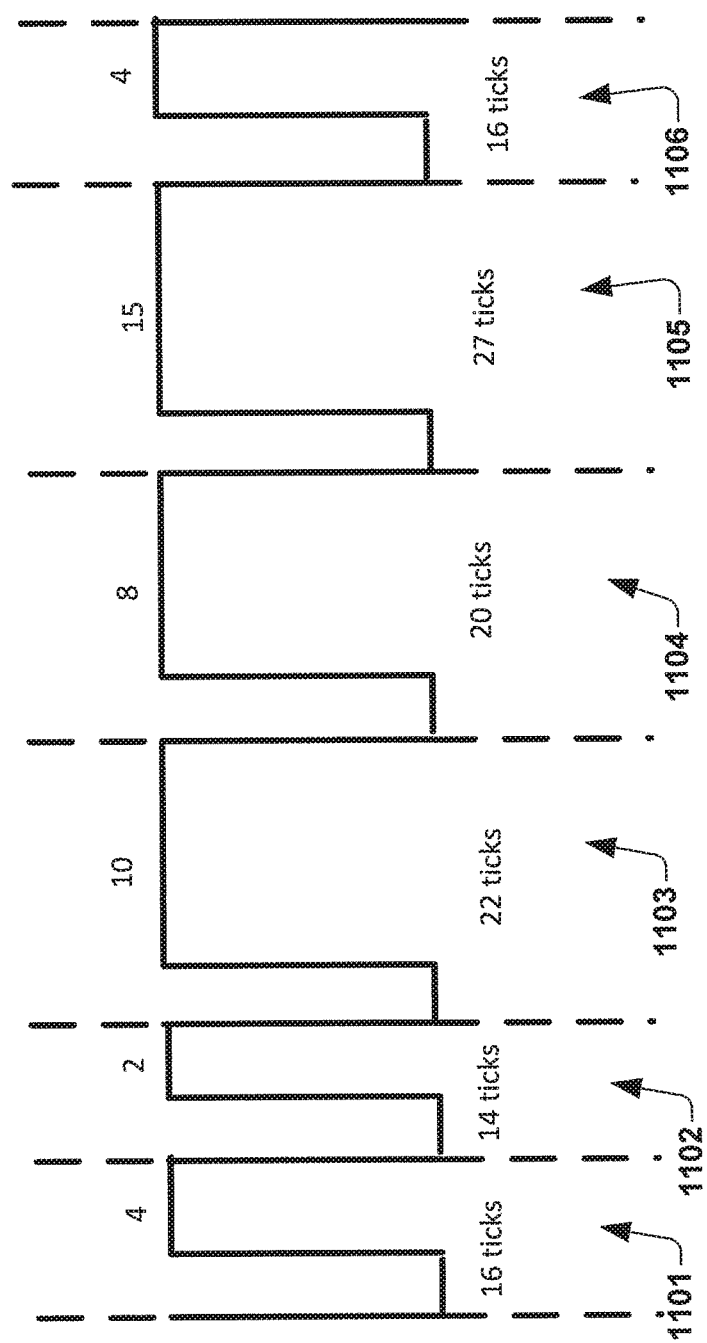

and the fifth nibble of the data grouping and the modulo-sum of the second, the fourth and the fifth nibble of the data grouping.

FIG. 12 illustrates the nibble indicia calculated as the modulo-4 sum of the five nibbles appended with the difference between the modulo-4 sums of the first set and the second set.

FIG. 13 illustrates a data protection system configured to generate nibble indicia used to protect the data to be transmitted.

FIG. 14 illustrates a sensor system configured to communicate protected sensor data.

FIG. 15 illustrates some disturbances projecting on a data packet, data grouping, nibble indicia, or train of nibble pulses.

FIG. 16A-16B illustrate a method for transmitting sensor data.

SPC SENSOR INTERFACE WITH PARTIAL PARITY PROTECTION

REFERENCE TO RELATED APPLICATION

This application claims priority to U.S. Provisional Application No. 62/134,925, filed on Mar. 18, 2015, the contents of which are incorporated by reference in their entirety.

FIELD

The present disclosure relates to a data protection system and method for transmitting multi-bit groups over a transmission interface.

BACKGROUND

Sensor interfaces like Short PWM Code (SPC) and Single Edge Nibble Transmission (SENT) use a Pulse Width Modulation (PWM) encoding for the transmission of 4 bit nibbles. A checksum is attached to the message to be transmitted in order to protect the message. The protection is usually a 4 bit Cyclic Redundancy Check (CRC).

Standard SENT or SPC use a N-bit CRC over all the bits of the message. Some protocols enhance the length of the CRC to better protect the message to be transmitted. However, this reduces the possible payload for a given channel. The Signal to Noise Ratio (SNR) of the Most Significant Bit (MSB) is very high due to the PWM. The probability of a MSB change is very small. If an error occurs in the MSB of the 4 bit nibble, then the PWM signal changes from a long pulse to a short pulse or vice versa. Thus, the MSB error is easily detectable using timing evaluation.

BRIEF DESCRIPTION OF THE DRAWINGS

FIG. 4A-FIG. 4B illustrate a parity taken over each individual nibble.

FIG. 5A-FIG. 5B illustrate a nibble indicia taken over only the first Least Significant Bit of each nibble.

FIG. 6A-FIG. 6B illustrate a nibble indicia taken over only the first two Least Significant Bits of each nibble.

FIG. 7A-FIG. 7B illustrate a nibble indicia taken over only the first three Least Significant Bits of each nibble.

FIG. 8A-FIG. 8D illustrate the calculation of the nibble indicia taken over the data grouping.

FIG. 9A-FIG. 9D illustrate the calculation of the nibble indicia for the respective nibble wherein the nibble indicia is appended to the end of the respective nibble.

FIG. 10A-FIG. 10C illustrate the reduction of the nibble length to three bits and the calculation of the nibble indicia for the respective nibble wherein the nibble indicia is appended to the end of the respective nibble.

FIG. 11 illustrates the nibble indicia calculated as the difference between the modulo-16 sum of the first, the third

DETAILED DESCRIPTION

Figure 1A:
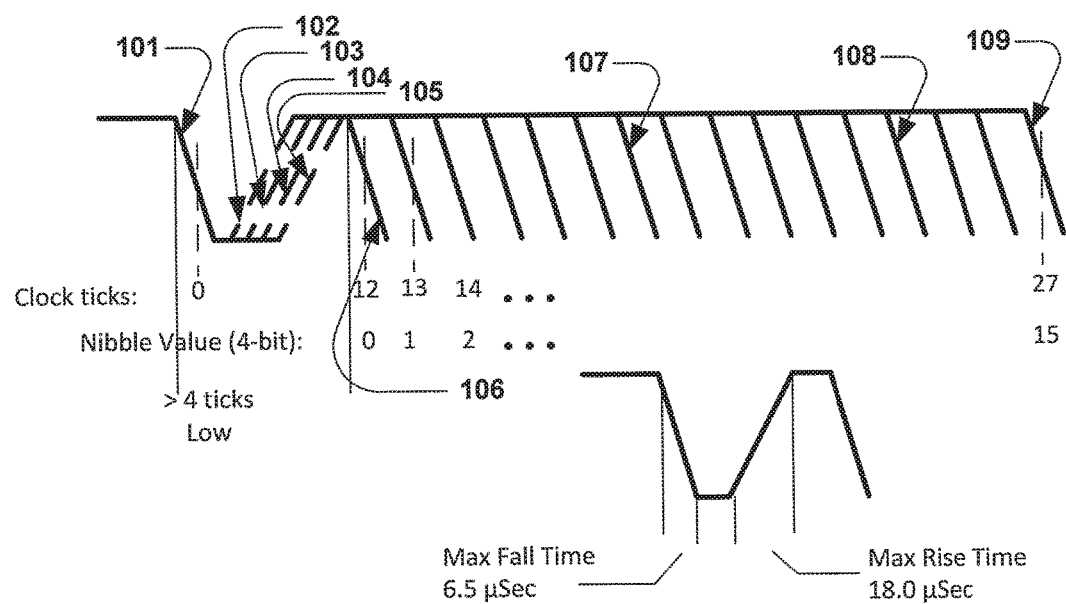
FIG. 1A illustrates a timing diagram of the transmission of a 4-bit nibble in accordance with a protocol.

A sensor system configured to communicate at least partially protected sensor data over a communication interface is disclosed. In accordance with one example of the disclosure, the sensor system comprises a sensor element and a communication interface communicatively coupled to the sensor element. The sensor element is configured to provide sensor data in the digital domain. The communication interface is configured to generate a data package for transmission over the communication interface from the sensor data. The data package comprises a data grouping comprising one or more nibbles related to the sensor data. The data package further comprises a nibble indicia based on at least a portion of selected nibbles within the data grouping. Further, multiple ways of generating the nibble indicia are disclosed for the partial protection of the sensor data.

The present disclosure will now be described with reference to the attached figures, wherein like reference numerals are used to refer to like elements throughout, and wherein the illustrated structures and devices are not necessarily drawn to scale. As utilized herein, terms "component," "system," "interface," "decoder" and the like are intended to refer to a computer-related entity, hardware, software (e.g., in execution), or firmware. For example, a component can be a processor, a process running on a processor, an object, an executable, a program, a storage device, an electronic circuit or a computer with a processing device. By way of illustration, an application running on a server and the server can also be a component. One or more components can reside within a process, and a component can be localized on one computer and/or distributed between two or more computers.

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Figure 13:
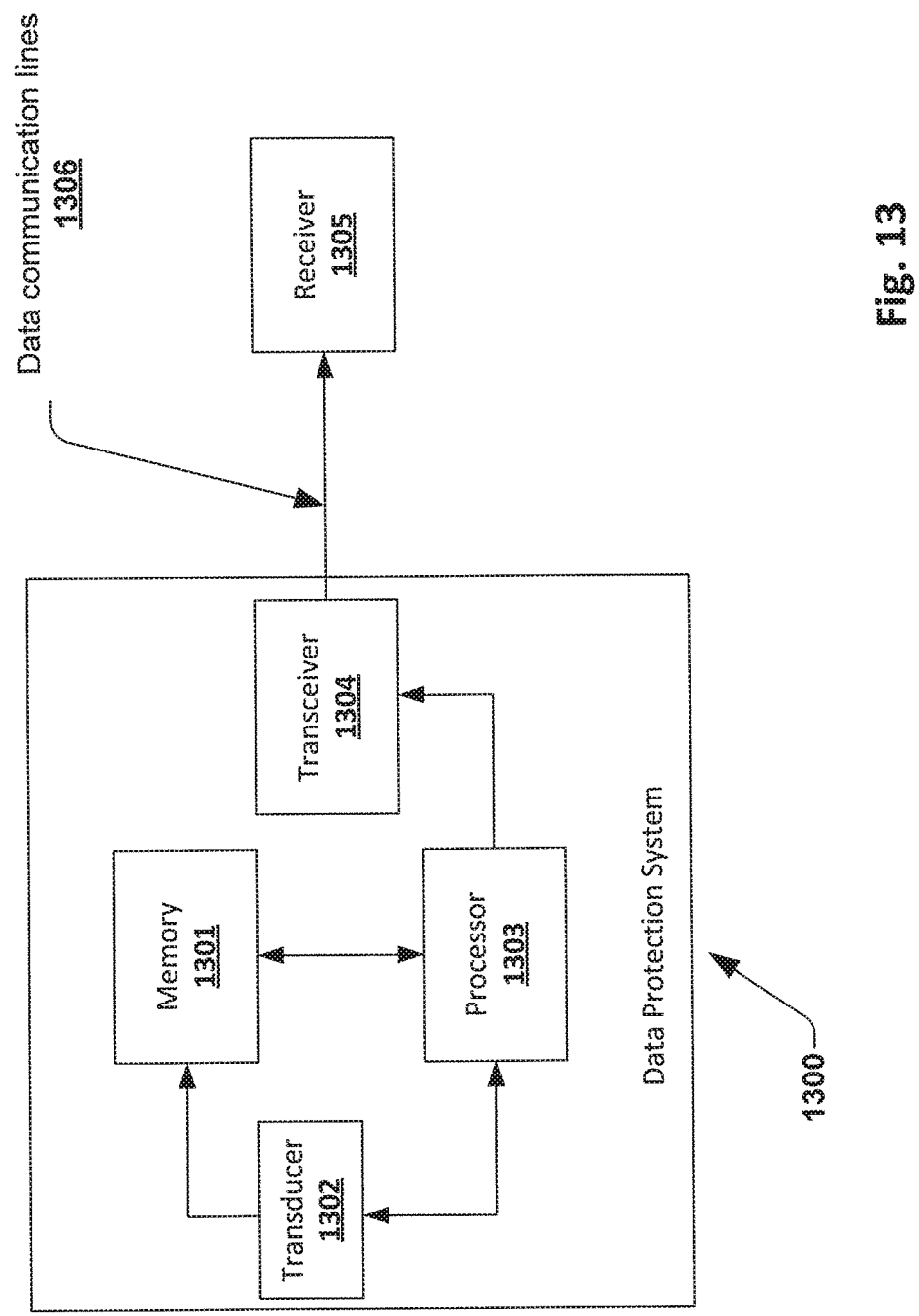

In FIG. 13, a data protection system 1300 is disclosed. The data protection system 1300 comprises a memory system 1301 configured to store payload data associated with a transducer 1302. The memory system 1301 is further configured to store executable instructions associated with a data transmission protocol. The data protection system 1300 further comprises a processor 1303 communicatively coupled to the memory system 1301, and configured to receive the payload data and the executable instructions. The processor 1303 is further configured to generate a transmission packet in accordance with the executable instructions. The transmission packet comprises a data grouping which comprises at least one nibble. The transmission packet further comprises a nibble indicia having a content based on at least a portion of the respective nibble or based on at least a portion of multiple nibbles in the data grouping. The data protection system 1300 further comprises a transceiver configured to transmit the transmission packet.

A non-transitory machine readable medium is disclosed. The non-transitory machine readable medium comprises instructions that, when executed, cause the machine to store payload data associated with a transducer and store executable instructions associated with a transmission protocol. The machine further receives payload data and executable instructions and generates a transmission packet in accordance with the executable instructions. The transmission packet comprises a data grouping comprising at least one nibble and a nibble indicia having a content based on at least a portion of the respective nibble or based on at least a portion of multiple nibbles in the data grouping, wherein the data grouping and the nibble indicia together comprise the transmission packet. The machine further transmits the transmission packet.

For example, in an automotive sensor system, a transducer or sensor may be a temperature sensor, a tire pressure sensor, an accelerometer, a steering torque sensor, a steering angle sensor, a gas pedal sensor, a throttle valve sensor, a pressure sensor, for example a manifold air pressure sensor, an airbag pressure sensor or an airbag accelerometer.

Automotive sensor networks have sensor interfaces like SPC or SENT which use PWM encoding for the transmission of 4 bit nibbles. In such an instance, the processor 1303 of FIG. 13 is configured to receive the payload data and executable instructions from the memory 1301 and generate the nibbles as disclosed below. FIG. 1A illustrates a timing diagram of the transmission of a 4-bit nibble in accordance with a protocol. The minimum nibble pulse width is 12 clock ticks, which represents a nibble value 0 and the maximum nibble pulse width is 27 clock ticks which represents a nibble value 15. Each nibble count is 1 clock tick. The nibble pulse has more than 4 clock ticks driven low time and all the remaining clock ticks driven high based on the nibble to be transmitted. In accordance with the example in FIG. 1A, the falling-edge 101 shows the beginning of the nibble pulse. Since more than 4 clock ticks are driven low and all the remaining clock ticks are driven high, any one of the rising edges 102-105 can be used. A person of skill in the art will readily appreciate that individual ones of the rising edges 102-105 within a nibble to be transmitted may be conveniently used for addressing or identifying individual sensors transmitting nibble over a common channel or line. Alternatively or additionally individual ones of the rising edges 102-105 may indicate an individual mode of a sensor transmitting nibbles over the (common) line. Such modes may comprise different sensitivity modes of the sensor, a calibration mode, or the like but is not limited thereto. The clock is then driven low based on the nibble to be transmitted. For example, to transmit a nibble of value 0, the falling-edge occurs at the 12th clock tick 106 from the beginning of the pulse. Similarly, to transmit nibbles with values 6, 12 and 15, the falling-edges occur at the 18th clock tick 107, 24th clock tick 108 and 27th clock tick 109 respectively.

Figure 1B:
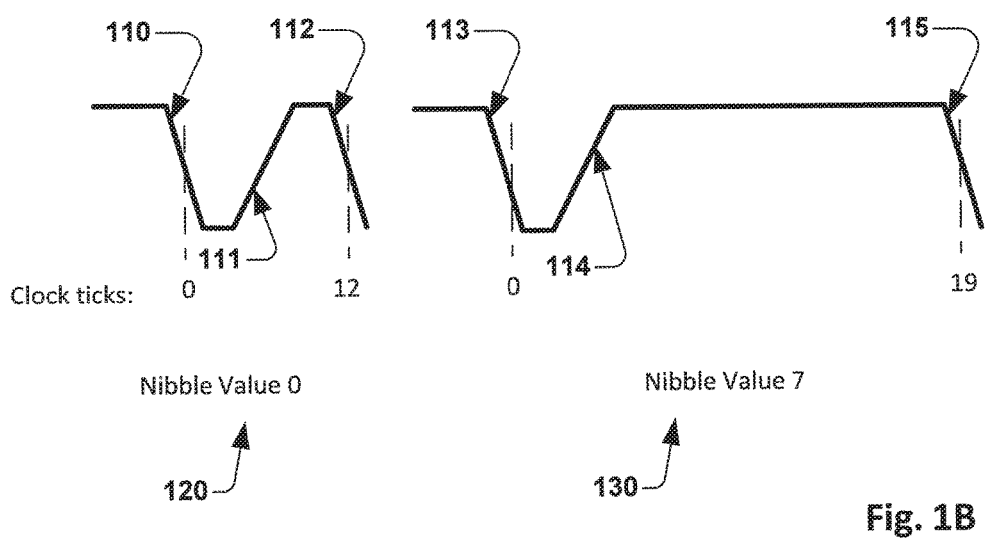
FIG. 1B illustrates the PWM encoding for nibble value 0 and nibble value 7.

FIG. 1B illustrates the PWM encoding for nibble value 0 and nibble value 7. The PWM encoding of the nibble value 0 is as shown in the element 120. The total clock tick count (falling-edge 110 to falling-edge 112) for transmitting the nibble value 0 is 12. That is, the nibble pulse begins with the falling-edge 110 and is driven low for more than 4 clock ticks. It is then driven high, which is represented by the rising-edge 111. The pulse remains high till it reaches the desired nibble value to be transmitted, which in accordance with this example is 0. Therefore, the falling-edge 112 occurs at the 12th clock tick from the beginning of the pulse, thus representing the end of the pulse. The PWM encoding of the nibble value 7 is as shown in the element 130. The total clock tick count (falling-edge 113 to falling-edge 115) for transmitting the nibble value 7 is 19. That is, the nibble pulse begins with the falling-edge 113 and is driven low for more than 4 clock ticks. It is then driven high, which is represented by the rising-edge 114. The pulse remains high till it reaches the desired nibble value to be transmitted, which in accordance with this example is 7. Therefore, the falling-edge 112 occurs at the 12th clock tick from the beginning of the pulse, thus representing the end of the pulse. One clock tick is assigned to each nibble value. A 4-bit nibble thus takes values from 0-15. Therefore, a PWM encoded nibble pulse may take 12-27 clock ticks.

Figure 2:
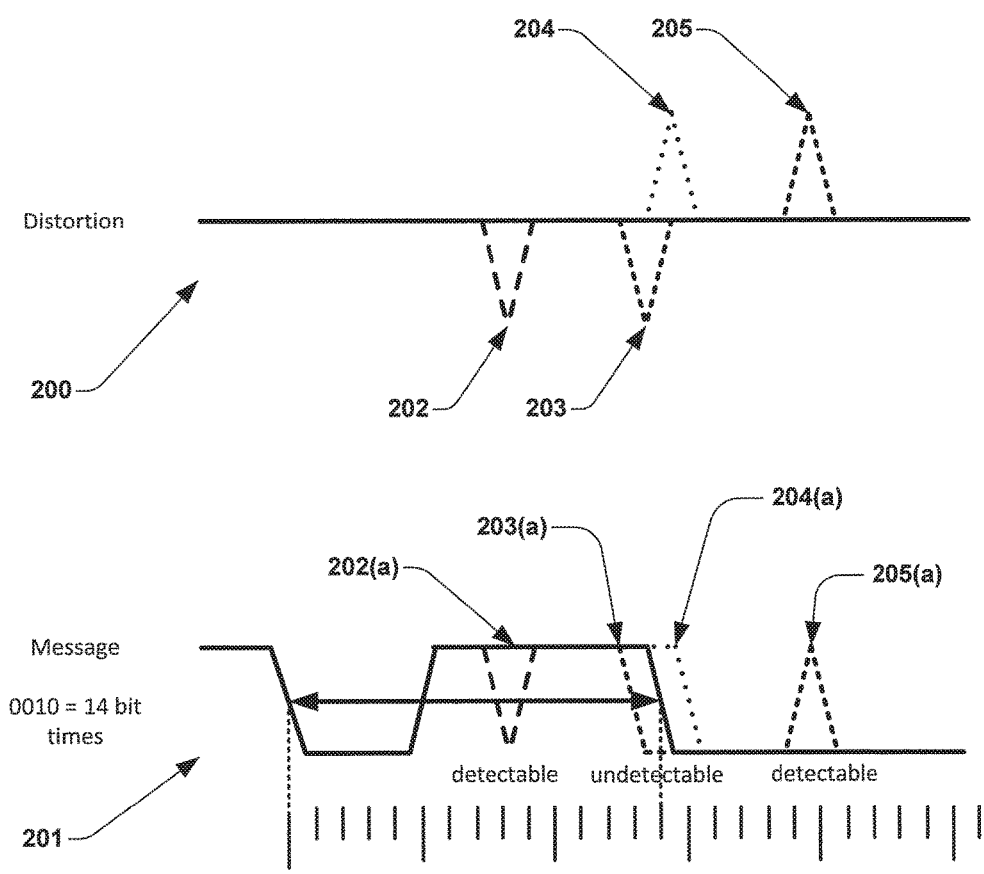
FIG. 2 illustrates the distortion in the transmission line that can occur during the transmission of a nibble.

FIG. 2 illustrates distortion in the transmission line that can occur during the transmission of a nibble. The distortion 200 can appear randomly in the transmission line. However, the detection of the distortion in the message is influenced by the time frame during which the distortion occurs. For example, the message 201 is PWM encoding of the nibble value 2. The nibble pulse length is 14 clock ticks. The influence of the spikes in the distortion 200 during four different time frames is discussed.

The spike 202 occurs in the present example in FIG. 2 when the message pulse is constantly high 202(a) and thus it is easily detectable. The spike 202 in this instance does not influence the nibble value (i.e., cause a potential error). Similarly, the spike 205 occurs when the message pulse is constantly low 205(a) and thus it is also easily detectable. The spike 205 in this instance does not influence the nibble value. However, the spikes 203 and 204 appear during the fall of the message from high to low. These spikes may result in the change of the nibble value. For spikes 203 or 204 the nibble value may change to one bit value lower as shown 203(a) wherein the falling edge that dictates the nibble value has shifted one clock tick to the left, or one bit value higher as shown by 204(a) wherein the falling edge that dictates the nibble value has shifted one clock tick to the right. This leads to reception of incorrect messages. In particular for the message affected by spikes 203 or 204 the actual nibble value, and hence the correct message is undetectable.

Figure 3A:
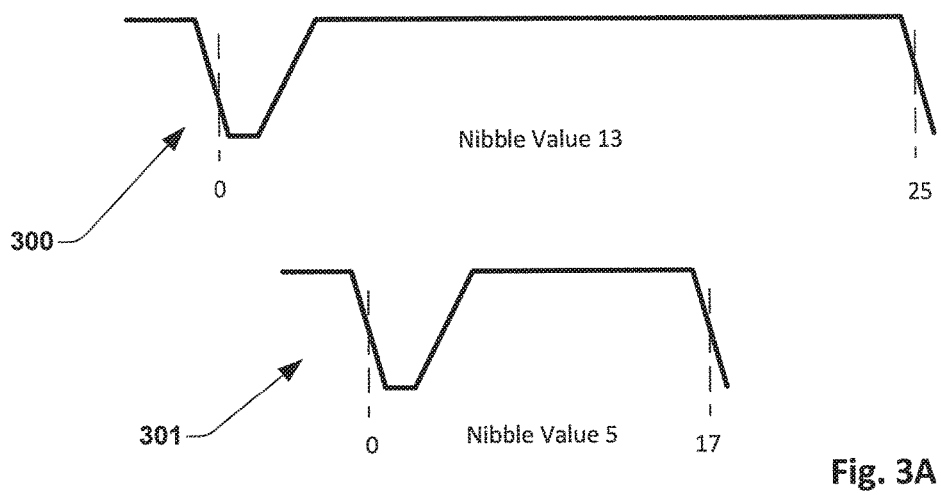
FIG. 3A illustrates an ease of error detection in the case of an MSB error.

The Signal to Noise Ratio (SNR) of the Most Significant Bit (MSB) is very high due to the PWM. The probability of a MSB change is very small. If an error occurs in the MSB of the 4 bit nibble, then the PWM signal changes from a long pulse to a short pulse or vice versa. Thus, the MSB error is easily detectable using a timing evaluation technique. FIG. 3A illustrates the ease of detection in the case of an MSB error. Timing diagram 300 of FIG. 3A shows the PWM coding of the nibble value 13. The total number of clock ticks to represent the nibble value 13 is 25. If an MSB error occurs, the nibble value changes from 13 to 5. The nibble value 13 is represented in binary as 1101. In case of an error, the MSB of the message 1 changes to 0, (i.e., 0101) and hence the nibble value in binary is now 5. The total number of clock ticks to represent the nibble value 5 is 17 which is represented by the element 301 of FIG. 3A. There is a significant difference in the number of clock ticks driven high when such an MSB error occurs and this is easily detectable by a timing evaluation.

Figure 3B:
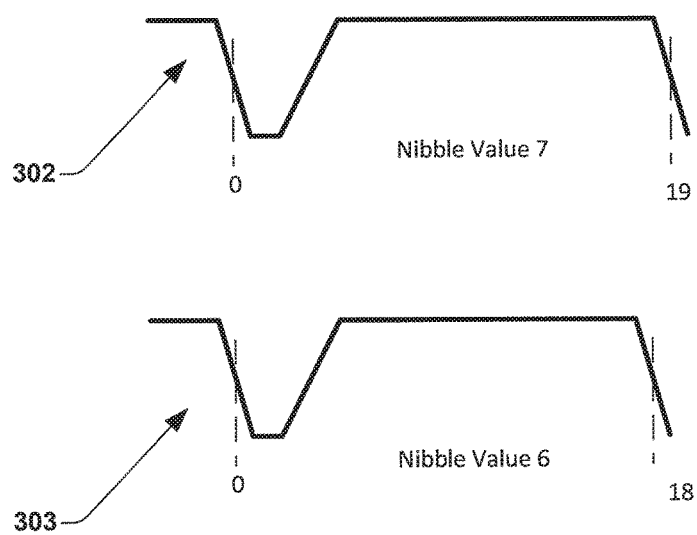
FIG. 3B illustrates an ease of error detection in case of an LSB error.

However, if an error occurs in the (Least Significant Bit) LSB of the nibble to be transmitted, it is difficult to detect the error using a timing evaluation. FIG. 3B illustrates the change in nibble value when there is an LSB error. Element 302 of FIG. 3B shows the PWM encoding of the nibble value 7. The total number of clock ticks to represent the nibble value 7 is 19. If an LSB error occurs, the nibble value changes from 7 to 6. The nibble value 7 is represented in binary as 0111. In case of an error, the LSB of the message 1 changes to 0 (i.e., 0110) and hence the nibble value in binary is now 6. The total number of clock ticks to represent the nibble value 6 is 18 which is represented by the element 303 of FIG. 3B. The difference in the number of clock ticks is significantly small and hence the detection of the LSB error during transmission is hard to determine.

In order to protect the message to be transmitted, a checksum is attached to the end of the message to be transmitted. The checksum is usually a 4-bit CRC taken over the entire message. However, as appreciated above, the error in MSB can easily be detected by a timing evaluation and thus it is not necessary to include the MSB in the calculation of the CRC. The different ways of calculating the CRC without including the MSB are appreciated below. In the following, multiple ways of improving the nibble indicia for better protection of the message are described.

FIG. 4A-FIG. 4B illustrate a parity taken over each individual nibble. In accordance with FIG. 4A, four data nibbles are transmitted with the nibble values 12, 7, 15 and 8, respectively. The four data nibbles are together termed as a data grouping. The corresponding clock ticks for these nibble values are 24, 19, 27 and 20 and the respective pulses are denoted by elements 401, 402, 403 and 404. A parity may be taken over each nibble value. For example, the parity 401(a) of the first nibble value 12 is 0, the parity 402(a) over the second nibble value is 1 and so on. The parity is located after the respective nibble such that the parity is distinct from the respective nibble. That is, the first nibble 12 is immediately followed by its parity which is then followed by the second nibble and its parity and so on. As can be seen in FIG. 4A the parity value is reflected in the width of the parity pulses. The parity can be replaced by a Cyclic Redundancy Check, a Hamming Code, a Turbo code or a Low Density Parity Check (LDPC). In general, these are termed as nibble indicia for further discussion.

In FIG. 4B, the nibble indicia associated with the respective nibble is collectively located after the data grouping such that the collective nibble indicia is distinct from the data grouping. The collective nibble indicia is obtained by appending the nibble indicia of each nibble. The parity taken over the data nibbles 401, 402, 403 and 404 are 0, 1, 0 and 1, respectively. Thus, in accordance with the example, collective nibble parity is 0101 in binary which corresponds to the nibble value 5 which further corresponds to a pulse length of 17 ticks which is represented by the element 405 appended to the end of the 4-bit nibble. It is advantageous to transmit the nibble indicia at the end of the data grouping as shown in FIG. 4B rather than transmitting each nibble indicia immediately after its corresponding data nibble as shown in FIG. 4A because, as shown in the example according to FIG. 4B, it takes lesser clock ticks to transmit the same information than the example according to FIG. 4A. Thus, the speed of the transmission over the interface is improved.

FIG. 5A-FIG. 5B illustrate a nibble indicia taken over only the first Least Significant Bit of each nibble termed as 1-LSB. For simplicity, a parity check over the first LSB is employed in the further examples to explain a nibble indicia. In accordance with the figures, the four data nibbles to be transmitted have the nibble values 12, 7, 15 and 8, respectively which constitute a data grouping. The corresponding clock ticks for these nibble values are 24, 19, 27 and 20 and the respective pulses are denoted by elements 501, 502, 503 and 504. A 1-LSB parity is taken over each nibble value. For example, the 1-LSB parity 501(a) of the first nibble value 12 is 0, the 1-LSB parity 502(a) over the second nibble value is 1 and so on. The 1-LSB parity is located after the respective nibble such that the 1-LSB parity is distinct from the respective nibble. That is, the first nibble 501 is immediately followed by its 1-LSB parity 501(a) which is then followed by the second nibble 502 and its 1-LSB parity 502(a) and so on.

In FIG. 5B, the nibble indicia associated with each respective nibble is collectively located after the data grouping (i.e., after the 4 nibbles) such that the collective nibble indicia is distinct from the data grouping. The 1-LSB parity taken over the data nibbles 501, 502, 503 and 504 are 0, 1, 1 and 0, respectively. The collective nibble 1-LSB parity 505 is thus 0110 in binary which corresponds to the nibble value 6 which further corresponds to a pulse length of 18 ticks which is represented by the element 505. It is advantageous to transmit the nibble indicia at the end of the data grouping as shown in FIG. 5B rather than transmitting the nibble indicia immediately after the corresponding data nibble as shown in FIG. 5A because, as shown in the example according to FIG. 5B, it takes lesser clock ticks to transmit the same information than the example according to FIG. 5A.

FIG. 6A-FIG. 6B illustrate a nibble indicia taken over only the first two Least Significant Bits of each nibble termed as 2-LSB. In FIG. 6A, the 2-LSB parity is located after each respective nibble such that the 2-LSB parity is distinct from the respective nibble. That is, the first nibble 601 is immediately followed by its 2-LSB parity 601(a) which is then followed by the second nibble 602 and its 2-LSB parity 602(a) and so on. However, in FIG. 6B, the nibble indicia 605 (2-LSB parity) associated with each respective nibble is collectively located after the data grouping (601-604) such that the collective nibble indicia is distinct from the data grouping. As can be seen, the time needed to transmit the data grouping and the nibble indicia in FIG. 6B is improved over that illustrated in FIG. 6A.

FIG. 7A-FIG. 7B illustrate a nibble indicia taken over only the first three Least Significant Bits of each nibble termed as 3-LSB. In FIG. 7A, the 3-LSB parity is located after each respective nibble such that the 3-LSB parity is distinct from the respective nibble. That is, the first nibble 701 is immediately followed by its 3-LSB parity 701(*a*) which is then followed by the second nibble 702 and its 3-LSB parity 702(*a*) and so on. However, in FIG. 7B, the nibble indicia 705 (3-LSB parity) associated with the respective nibble is collectively located after the data grouping (701-704) such that the collective nibble indicia is distinct from the data grouping. As can be seen, the time needed to transmit the data grouping and the nibble indicia in FIG. 7B is improved over that illustrated in FIG. 7A.

FIG. 8A-FIG. 8D illustrate the calculation of the nibble indicia taken over the data grouping. A parity check is employed as the nibble indicia in the following examples. In accordance with the figures, the four data nibbles to be transmitted have the nibble values 12, 7, 15 and 8, respectively which constitute a data grouping. The corresponding clock ticks for these nibble values are 24, 19, 27 and 20 and the respective pulses are denoted by elements 801, 802, 803 and 804. A parity is taken over the entire message, that is over all 4 nibbles. The parity is then located after the data grouping. Referring to FIG. 4A, the nibble indicia located after the data grouping is a collective nibble indicia. That is, the nibble indicia of all the respective nibbles are appended to form a collective nibble indicia which is located at the end of the data grouping. However, in accordance with the example in FIG. 8A, the nibble indicia is calculated over all the nibbles of the data grouping and located at the end of the data grouping.

In FIG. 8B, a 1-LSB parity of every nibble is taken over the entire the data grouping. The LSBs of the data nibbles 12, 7, 15, and 8 are 0, 1, 1 and 0, respectively. The parity is now taken over these LSBs and is located after the data grouping.

In FIG. 8C, a 2-LSB parity of every nibble is taken over the entire data grouping. The first two LSBs of the data nibbles 12, 7, 15, and 8 are 0, 0; 1, 1; 1, 1; and 0, 0, respectively. The parity is now taken over these bits which correspond to the value 0 which further corresponds to 12 clock ticks represented by the element 807. The parity is located after the data grouping.

In FIG. 8D, a 3-LSB parity of every nibble is taken over the entire data grouping. The first three LSBs of the data nibbles 12, 7, 15, and 8 are 1, 0 and 0; 1, 1 and 1; 1, 1 and 1; and 0, 0 and 0, respectively. The parity is now taken over these bits which correspond to the value 1 which further corresponds to 13 clock ticks represented by the element 808. The parity is located after the data grouping.

FIG. 9A-FIG. 9D illustrate the calculation of the nibble indicia for the respective nibble wherein the nibble indicia is appended to the end of the respective nibble and is not distinct from the nibble itself, for example, as illustrated in FIG. 4A. A parity check is employed as the nibble indicia in the following examples. In accordance with the figures, the four data nibbles to be transmitted have the nibble values 12, 7, 15 and 8 which constitute a data grouping. The corresponding clock ticks for these nibble values are 24, 19, 27 and 20.

In FIG. 9A, a parity is taken over each nibble and the parity is appended at the end of the respective nibble. The first nibble having the nibble value 12 can be represented in the binary form as 1100. This has a parity of 0. This parity is appended to the end of the binary number making it 11000 which corresponds to the nibble value 24. The nibble pulse length to represent the nibble value has 36 clock ticks which is represented by the element 901 in the FIG. 9A. Similarly, the nibble indicia is calculated for the rest of the nibbles in the data grouping.

In FIG. 9B, a 1-LSB parity is taken over each nibble and the 1-LSB parity is appended at the end of the respective nibble. The first nibble having the nibble value 12 can be represented in the binary form as 1100. This has a 1-LSB parity of 0. This 1-LSB parity is appended to the end of the binary number making it 11000 which corresponds to the nibble value 24. The nibble pulse length to represent the nibble value has 36 clock ticks which is represented by the element 905 in FIG. 9B. Similarly, the nibble indicia is calculated for the rest of the nibbles in the data grouping.

In FIG. 9C and FIG. 9D, a 2-LSB parity and a 3-LSB parity is taken over each nibble respectively. The 2-LSB parity is appended at the end of the respective nibble in the embodiment defined in FIG. 9C and the 3-LSB parity is appended at the end of the respective nibble in the embodiment defined in FIG. 9D.

Figure 10C:
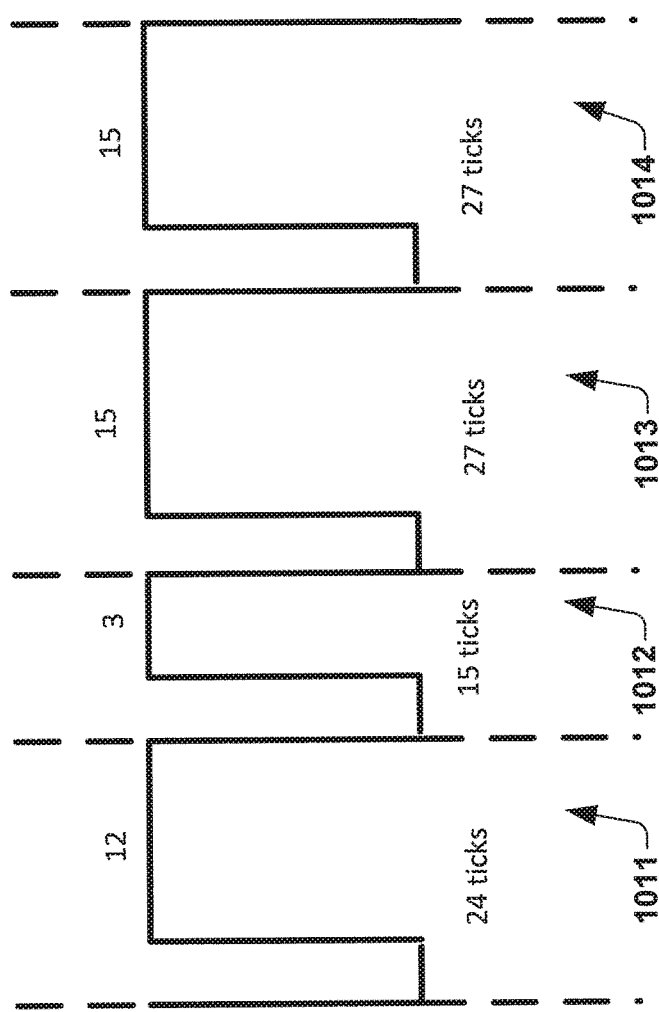

In accordance with another communication protocol, a nibble has three bits. FIG. 10A-FIG. 10C illustrate the reduction of the nibble length to three bits and the calculation of the nibble indicia for the respective nibble wherein the nibble indicia is appended to the end of the respective nibble. A parity check is employed as the nibble indicia in the following examples. In accordance with the figures, the three 4-bit data nibbles to be transmitted have the nibble values 12, 7 and 15. These are represented in binary as 1100, 0111 and 1111. These three 4-bit nibbles are reduced or transformed to four 3-bit nibbles containing the same information but having different grouping. The three 4-bit nibbles 1100, 0111 and 1111 grouped together give a string of 12 bits 110001111111. This string of 12 bits is now grouped into four 3-bit nibbles 110, 001, 111 and 111. Thus, the three 4-bit nibbles 1100, 0111 and 1111 are regrouped to four 3-bit nibbles 110, 001, 111 and 111. These four 3-bit nibbles together form the data grouping. In FIG. 10A, a 1-LSB parity is taken over each 3-bit nibble and the 1-LSB parity is appended at the end of the respective nibble. The first nibble having the nibble binary value 110 can be represented as the nibble value 6. This has a 1-LSB parity of 0. This 1-LSB parity is appended to the end of the binary number making it 1100 which corresponds to the nibble value 12. The nibble pulse length to represent this nibble value has 24 clock ticks, which is represented by the element 1001 in FIG. 10A. Similarly, the nibble indicia is calculated for the rest of the 3-bit nibbles in the data grouping. In such an instance, the second, the third and the fourth nibble having the nibble values 001, 111 and 111 respectively have the 1-LSB parity values 1, 1 and 1 respectively. These 1-LSB parity values are appended at the end of the respective nibbles making them 0011, 1111 and 1111, which correspond to the nibble values 3, 15 and 15 respectively. The nibble pulse length to represent these nibble values have 15, 27 and 27 clock ticks, which are further represented by the elements 1002, 1003 and 1004 respectively in FIG. 10A.

In FIG. 10B and FIG. 10C, a 2-LSB parity and a 3-LSB parity is taken over each 3-bit nibble respectively. The 2-LSB parity is appended at the end of the respective nibble in the embodiment defined in FIG. 10B. For example, the first nibble having the binary value 110 can be represented as the nibble value 6. This has a 2-LSB parity of 1 (parity taken over the two Least Significant Bits of the nibble, 1 and 0). The 2-LSB parity is appended at the end of the binary number making it 1101 which corresponds to the nibble value 13. The nibble pulse length to represent this nibble value has 25 clock ticks, which is represented by the element 1006 in FIG. 10B. Similarly, the nibble indicia is calculated for the rest of the 3-bit nibbles in the data grouping.

The 3-LSB parity is appended at the end of the respective nibble in the embodiment defined in FIG. 10C. For example, the first nibble having the binary value 110 can be represented as the nibble value 6. This has a 3-LSB parity of 0 (parity taken over the three Least Significant Bits of the nibble, 1, 1 and 0). The 3-LSB parity is appended at the end of the binary number making it 1100 which corresponds to the nibble value 12. The nibble pulse length to represent this nibble value has 24 clock ticks, which is represented by the element 1011 in FIG. 10C. Similarly, the nibble indicia is calculated for the rest of the 3-bit nibbles in the data grouping.

In another embodiment, nibble indicia is taken over a different number of Least Significant Bits (LSBs) for different data nibbles in the data grouping. For example, a 3-LSB parity can be taken over the most significant data nibble, 1-LSB parity can be taken over the least significant data nibble and a 2-LSB parity can be taken over the other nibbles.

The term modulo-16 sum is appreciated below with an example for a better understanding of the term. Consider three numbers 10, 15 and 20. The sum of these three numbers is 45. The remainder obtained when the sum of the numbers is divided by 16 is called the modulo-16 sum of the numbers. Therefore, the modulo-16 sum of 10, 15 and 20 is 13 because the remainder obtained when 45 is divided by 16 is 13.

Further, in another embodiment, the data grouping consists of five data nibbles. The nibble indicia in accordance to one embodiment is the difference between the modulo-16 sum of the first, the third and the fifth nibble of the data grouping and the modulo-16 sum of the second, the fourth and the fifth nibble of the data grouping. In accordance with FIG. 11, the five data nibbles to be transmitted have nibble values 4, 2, 10, 8 and 5 which correspond to 16, 14, 22, 20 and 27 clock ticks respectively, which are represented by the elements 1101, 1102, 1103, 1104 and 1105 respectively. The modulo-16 sum of the first, the third and the fifth nibble is 13. The modulo-16 sum of the second, the fourth and the fifth nibble is 9. The nibble indicia 1106 is the difference between the two modulo-16 sums, which is 4. This corresponds to a pulse with 16 clock ticks. The nibble indicia is located after the data grouping such that the nibble indicia is distinct from the data grouping.

The term modulo-4 sum is appreciated below with an example for a better understanding of the term. Consider three numbers 10, 15 and 20. The sum of these three numbers is 45. The remainder obtained when the sum of the numbers is divided by 4 is called the modulo-4 sum of the numbers. Therefore, the modulo-16 sum of 10, 15 and 20 is 1 because the remainder obtained when 45 is divided by 4 is 1.

Figure 12:
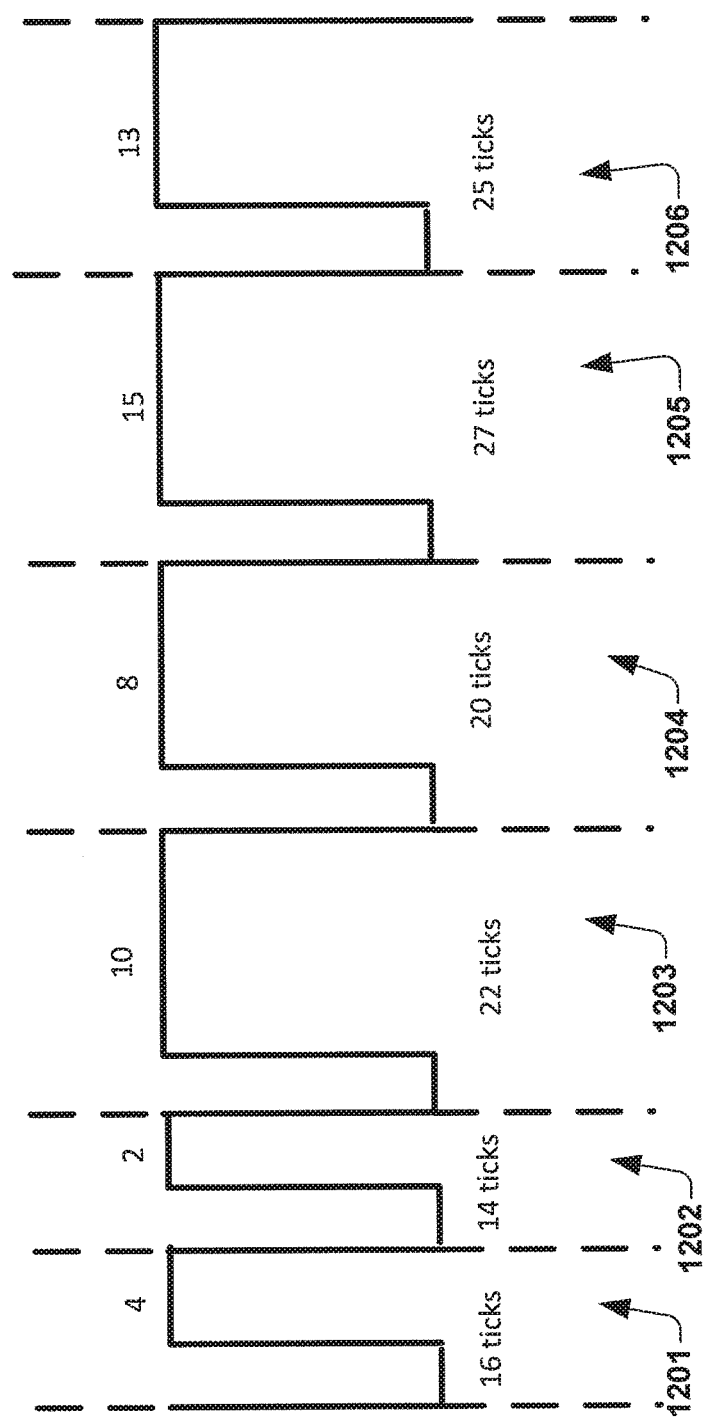

In accordance with FIG. 12, the five data nibbles to be transmitted have nibble values 4, 2, 10, 8 and 15 which correspond to 16, 14, 22, 20 and 27 clock ticks respectively, which are represented by the elements 1201, 1202, 1203, 1204 and 1205, respectively. The modulo-4 sum of the five nibbles is 3 which is represented by the binary number 11. The modulo-4 sum of the first set which comprises the first, the third and the fifth nibble is 2. The modulo-4 sum of the second set which comprises the second, the fourth and the fifth nibble is 1. The difference between the modulo-4 sums of the first set and the second set is 1, which is represented by the binary number 01. The nibble indicia 1206 is the modulo-4 sum of the five nibbles appended with the difference between the modulo-4 sums of the first set and the second set. The nibble indicia in binary is thus 1101 which corresponds to the nibble indicia value 13 which further corresponds to 25 clock ticks.

While modulo-4 and modulo-16 have been discussed as examples for calculation as well as sums or differences thereof, other forms of calculating a collective nibble indicia are conceivable. As non-limiting example consider a data grouping of nibbles representing decimal values 3, 5, 14, 12, and 8 to be transmitted as the data grouping. It is well conceivable to use negative values for some of the nibbles within the data grouping, say the second and the fourth value within the data grouping, while the first, the third and the fifth value remain unaltered. If now the modulo-16 sum is calculated from the amended data grouping representing (decimal) 3, −5, 14. −12, 8, which is 8 (decimal). This value may be transmitted as the collective nibble indicia when transmitting the decimal values 3, 5, 14, 12, and 8 as nibbles within the data grouping and/or the collective nibble indicia. A single-bit error on the channel or line may alter the transmitted nibbles to represent decimal values 3, 6, 13, 12 and 8, which will cause a receiving interface 300 (as explained in detail below) to calculate as collective nibble indicia representing decimal 6 instead of the original decimal value of 8. There may be circumstances, where such an approach of calculating the collective nibble indicia is not fully covering all single-bit errors. Such circumstances may occur if an even number of nibbles is to be transmitted as the data grouping and the collective nibble indicia is intended to detect a bit-error affecting the calibration or synchronization pulse (see SYNC in FIG. 15). Under such circumstances all nibbles within the data grouping may be incremented or decremented by 2 LSB, which may mean the sign-alternating sum is not appropriate to detect such disturbances. To this end a (collective) nibble indicia may be chosen taking the modulo-4 sum of the sign-alternating values and a modulo-4 sum of non-sign-alternating values. Such a method of calculating the (collective) nibble indicia may be referred to as an "even" or "E" method. One may show that the non-alternating sign sum is however capable of detecting the single-bit error as described before. Both methods of calculating the (collective) nibble indicia are able to detect single-bit errors, in particular in cases where the data grouping is being stored in registers or transmitted on a bus during a setup of the bus or channel before and/or after transmission of the data package.

Figure 14:
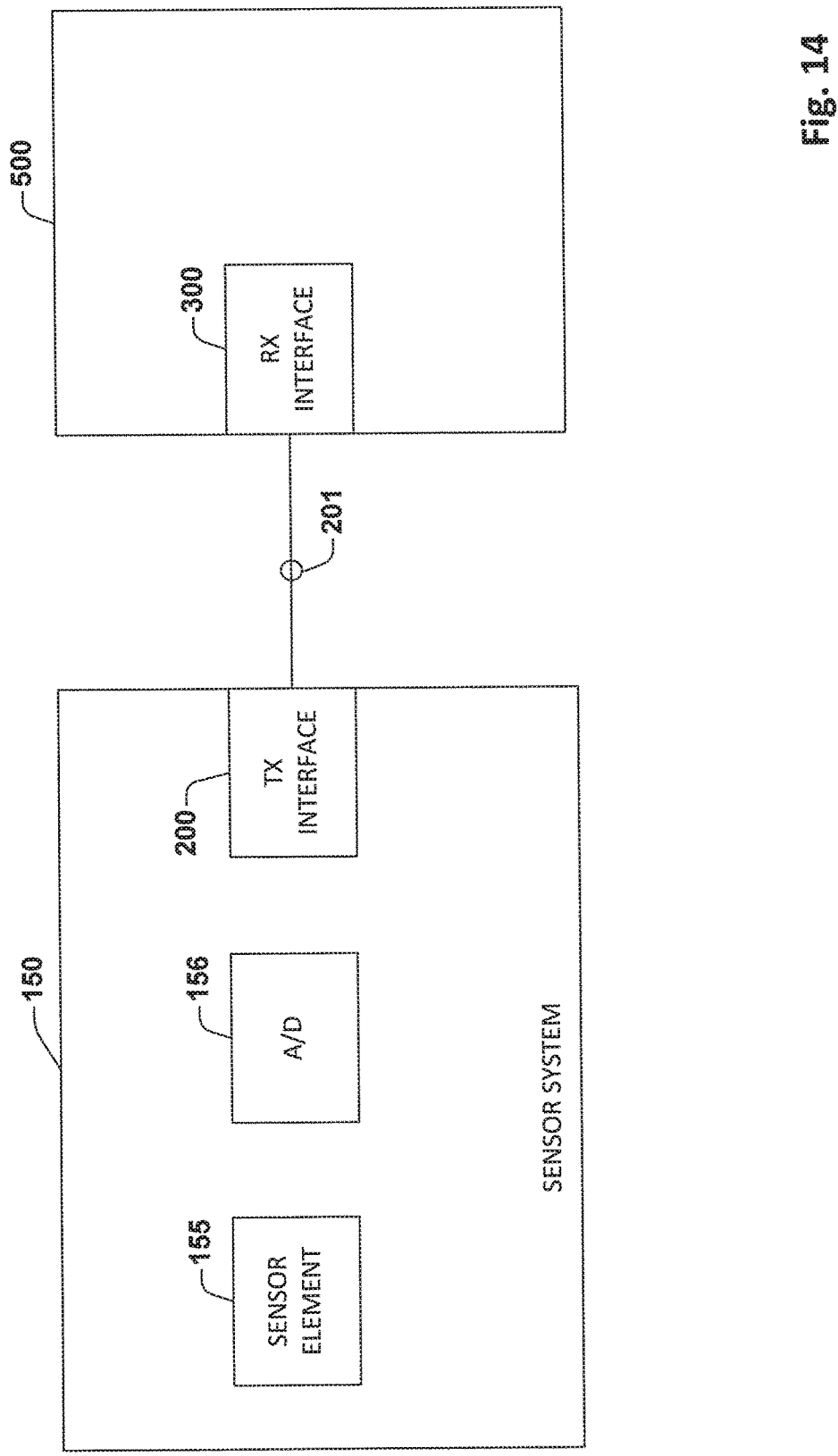

FIG. 14 illustrates a sensor system 150 for which data protection techniques as disclosed before and described in relation with FIGS. 1A-12 may be of interest in order to protect sensor data in combination with a sensor system 150. In particular the data protection techniques may be of interest with regards to a sensor system usable in the automotive arena but not limited thereto. Such sensor systems are for example a steering angle sensor or steering torque sensor using a PWM protocol, such as the SPC protocol for transmission of the sensor data from a sensor system 150 over a transmission interface 200 to a receiving interface 300. Clearly the data protection techniques described in this disclosure may be used for other sensor systems as well; the sensor system of the angle sensor/torque sensor is to be construed as an example for illustrative purposes and in no ways limiting the teachings of the present disclosure.

It is of interest to transmit a (i.e., digital) representation of the sensor data from the transmission interface 200 to the receiving interface 300 using a cable or a bus system. It is to be understood that the sensor system 150 may comprise a sensor element 155. The sensor element 155 may be measuring a physical parameter, such as for example an angle of rotation, but is not limited thereto. In principle the data protection techniques described above may be used in combination with any sensor system 150 providing sensor data relating to the physical quantity in the digital domain. The disclosed data protection techniques are of particular advantage when using a channel or bus of rather low quality and throughput. One convenient way of digitally representing the sensor data may be in nibbles as described above. The sensor system 150 may comprise an analog to digital (A/D) converter 156 configured to provide a digital representation of the sensor signal taken in the analog domain. Details of the actual sensor element 155 and/or the A/D converter 156 are not of particular relevance for the teachings of the present disclosure and shall therefore not be explained in detail.

The sensor system 150 comprises a communication interface 200. The communication interface 200 is configured to provide a data grouping of the sensor signal as discussed above. Conveniently the data grouping comprises digital representations of individual sensor signals. This is to say digital representations of actual values of the physical parameter measured by the sensor element 155. In one embodiment digital representations of signals as data grouping are nibbles as explained above, for example nibbles 801, 802, 803 and 804 as explained with regards to FIGS. 8A and 8B due to the simple and cost-efficient implementation of the transmitting communication interface 200 and the receiving interface 300.

The communication interface 200 is further configured to provide a nibble indicia in order to at least partially protect digital representations of sensor data (i.e. nibbles) within the data grouping. The nibble indicia may be without limitation implemented as individual indicia appended or inserted into a sequence of nibbles (namely the data grouping). It may be convenient to insert the indicia for an individual nibble of the data grouping after a respective data nibble, see for example individual indicia 401(*a*) for data nibble 401 of FIG. 4A.

Alternatively or additionally the nibble indicia may be implemented as collective indicia, say indicia 405 of FIG. 4B, after the data grouping, for example after the nibbles 401-404 of FIG. 4B as explained before on various occasions.

Further the communication interface 200 may be configured to communicate data packets 201 from the sensor system 150 to a receiving interface 300. To this end the communication interface 200 is configured to provide data packets to be transmitted. The data packets may conveniently comprise the data grouping together with the collective and/or individual nibble indicia as was explained with regards to FIG. 4A-12. Obviously the communication interface 200 may comprise some sort of memory and/or data processing capability, for example in the form of a digital signal processor. Additionally or alternatively the receiving interface 300 may be without limitation implemented as hardware or as software or a combination thereof, and preferably implemented using a digital signal processor.

Depending on circumstances, it may be of interest to represent the data grouping and the nibble indicia as nibbles, alike. The data protection schemes according to the present disclosure are however not limited thereto.

A person of ordinary skill will appreciate that it is of interest to provide the data package as a sequence of nibbles as such a representation—as was described above in detail—allows for cost-efficient implementations of the transmitting interface 200, the receiving interface 300 as well as the line or channel coupling the transmitting interface 200 and the receiving interface 300. It will be further appreciated that the data protection techniques described herein are of particular interest to improve robustness of data transmission according to a PWM protocol, preferably the SPC protocol.

Some benefits of the data protection schemes disclosed herein will become apparent with regards to the receiving interface 300 receiving data packets 201 over a channel or line from the transmitting communication interface 200. Typically the receiving interface 300 may be implemented as part of an electronic control unit 500 configured to receive and/or decode the data packets corresponding to sensor signals from the sensor system 150, but is not limited thereto.

The receiving interface 300 may further be implemented as a stand-alone device, as a set of computer implemented instructions. The receiving interface 300 may be without limitation implemented as hardware or as software or a combination thereof, and preferably implemented using a digital signal processor.

In one embodiment the receiving interface 300 is configured to recover or decode the digital representation of the sensor signal from the data packets 201 received from the communication interface 200 of the sensor system 150. In other words, in one embodiment the receiving interface 300 is configured to identify the data grouping and the (collective) nibble indicia within an individual one of the data packets 201 received from the communication interface 200, for example, received at the receiving interface 300. The combination of the data grouping and the nibble indicia may be used by the receiving interface 300 to correct errors within a received data grouping. If an error is identified for a given data grouping, the receiving interface 300 may take appropriate action. Such action may include correcting the discovered error within the data grouping, discarding the given data grouping, requesting the sensor system 150, i.e. the communication interface 200, to resend a data packet 201 comprising a new data grouping, invalidating sensor data corresponding to the given data grouping, but is not limited thereto.

Figure 15:
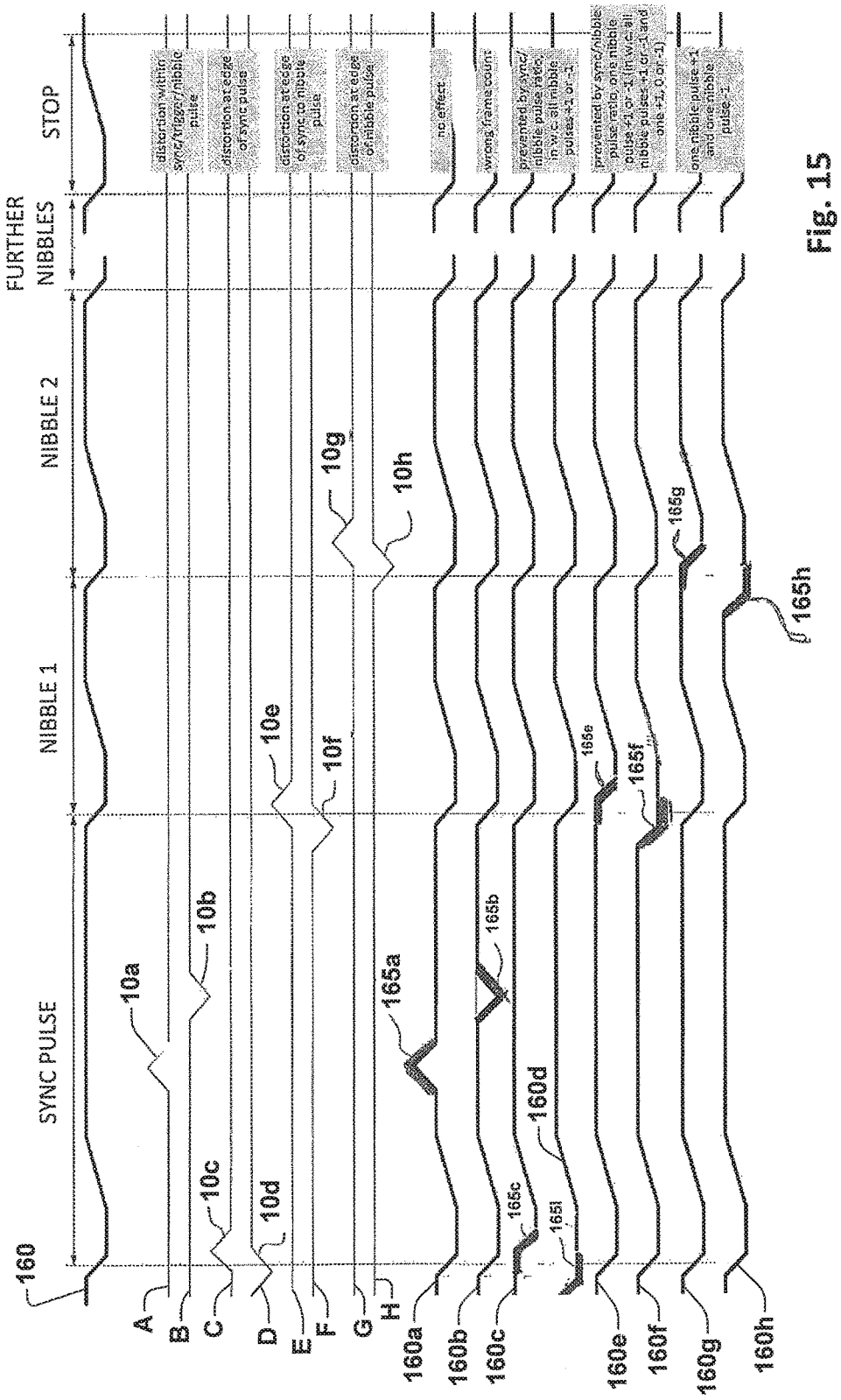

FIG. 15 illustrates how the data protection techniques disclosed herein may be of interest for pulse width modulation PWM protocols such as SENT or SPC protocol. To this end an effect of various external disturbances on (payload) data transmitted over a line using a PWM protocol will be explained in detail in the following. An undisturbed signal 160 illustrates an undisturbed (portion of) a data package 210 to be transmitted over the channel or line over time. It is to be understood that the undisturbed signal 160 may comprise a portion of a data package 210, a complete data package 210 or several data packages 210, hence including a complete data grouping or a portion of a data grouping, depending on circumstances.

The signal 160 can be divided into a synchronization pulse or portion SYNC, a first pulse or nibble NIBBLE1, and a second pulse or nibble NIBBLE2. There may be more pulses comprised in the undisturbed signal 160 which are not shown but indicated by a section further nibbles NIBBLES. The data package may be finished by a last or stop nibble STOP. A person of skill will appreciate that pulse or nibble length according to SENT or SPC are conveniently calculated from the first falling edge until the last falling edge of a Nibble, as is the case for the sync pulse SYNC, the first nibble NIBBLE1, the second nibble NIBBLE2, and the further nibbles NIBBLES in FIG. 15. For the stop nibble STOP, it may be convenient to actively pull-up the line by the transmitting entity, such as the communication device, so that subsequent nibbles may be calculated from falling edge to falling edge, again.

Plots A-H in FIG. 15 illustrate disturbances 10a-10h, respectively which occur at different timings and may project onto the undisturbed signal 160, leading to perturbed signals 160a-160h, comprising disturbances 165a-165h, respectively. Each of these disturbances 165a-165h may have different effects onto an integrity of the signals 160a-160h, respectively.

Consider case A, wherein a positive disturbance 10a projects onto the undisturbed signal 160, and a disturbed signal 160a comprising disturbance 165a is generated. The positive disturbance 165a has no effect on any timing within the data package 210, as the length of individual pulses for the SENT or SPC protocol is calculated between falling edges. Therefore the disturbance 165a will have substantially no effect on the data package 210 or individual nibbles contained therein. As a consequence the receiving interface 300 will be able to decode all nibbles within the data grouping and the (collective) nibble indicia correctly.

Next, consider case B of a negative disturbance 10b projecting onto the undisturbed signal 160, and a disturbed signal 160b comprising disturbance 165b is generated. The negative disturbance 165a will lead to an incorrect frame count as the negative disturbance 165b introduces a further falling which will be construed as an end of the synchronization pulse SYNC. Such a disturbance will however be recognized, as it leads to an incorrect frame count. The frame count of a nibble representing a decimal value, say 7 (see nibble 402 in FIGS. 4A and 4B), is given by the tick count for the whole nibble 402 of 19 ticks, as a difference in clock ticks between the total nibble length and the represented (digital) value is 12. Therefore such a disturbance will be recognized by an incorrect frame count at the receiving interface 300 between the SYNC and the STOP nibble, and appropriate actions may be taken.

Next, consider case C of a positive disturbance 10c projecting onto the undisturbed signal 160, and a thus generating disturbed signal 160c comprising disturbance 165c. The positive disturbance 165a will lead to a shift of the first falling edge of the synchronization pulse SYNC, rendering the SYNC nibble longer. Such an error may be however detected using a length check between the SYNC nibble and the STOP nibble. Within some limits nibbles within the data grouping may still be correctly decoded at the receiving interface 300 as all nibble pulses may be increased or decreased by one tick. The receiving interface 300 may therefore take appropriate action to either correct the received nibbles within the data message or data grouping, invalidate values corresponding to the received nibbles, request sending of a new data package, but is not limited thereto.

Now consider case D of a negative disturbance 10d projecting onto the undisturbed signal 160, generating disturbed signal 160d comprising the disturbance 165d. The negative disturbance 165d will lead to an incorrect frame count as the negative disturbance 165d introduces a further falling edge which will be construed as an early start of the synchronization pulse SYNC. As for case C within some limits nibbles within the data grouping may still be correctly decoded at the receiving interface 300, as all nibble pulses may be increased or decreased by one tick. The receiving interface 300 and/or an (Electronic Control Unit) ECU 500 may take appropriate actions.

Now consider case E of a positive disturbance 10e projecting onto the undisturbed signal 160, and thus generating disturbed signal 160e comprising disturbance 165e. The positive disturbance 165e will lead to a shift of the second falling edge of the synchronization pulse SYNC, rendering the SYNC nibble longer. Such an error may be however detected using a length check between the SYNC nibble and the STOP nibble which will be amended by minus one tick. Within some limits multi-bit errors within nibbles comprised in the data grouping may still be correctly decoded at the receiving interface 300 as all nibble pulses may be increased or decreases by one tick, while one nibble may not be altered in length. The receiving interface 300 may therefore take appropriate action to either correct the received nibbles within the data message or data grouping, invalidate values corresponding to the received nibbles, request sending of a new data package, but is not limited thereto.

Now consider case F of a negative disturbance 10f projecting onto the undisturbed signal 160, and thus generating disturbed signal 160f comprising disturbance 165f. The negative disturbance 165f will lead to a shift of the second falling edge of the synchronization pulse SYNC, rendering the SYNC nibble longer. Such an error may be however detected using a length check between the SYNC nibble and the STOP nibble which will be amended by minus one tick. Within some limits multi-bit errors in nibbles within the data grouping may still be correctly decoded at the receiving interface 300 as all nibble pulses may be increased or decreases by one tick, while one nibble may not be altered in length. The receiving interface 300 may therefore take appropriate action to either correct the received nibbles within the data message or data grouping, invalidate values corresponding to the received nibbles, request sending of a new data package, but is not limited thereto.

Now consider case G of a positive disturbance 10g projecting onto the undisturbed signal 160, and thus generating disturbed signal 160g comprising disturbance 165g. The positive disturbance 165g will lead to a shift of the second falling edge of the exemplary nibble pulse NIBBLE1, rendering the NIBBLE1 nibble longer, while the subsequent nibble NIBBLE2 is shortened by one tick, hence NIBBLE1 will be increased by 1LSB, while NIBBLE2 is decreased by 1LSB.

Similarly, in case H however a negative disturbance 10h projecting onto the undisturbed signal 160, and thus generating disturbed signal 160h comprising disturbance 165h. The negative disturbance 165h will lead to a shift of the second falling edge of the exemplary nibble pulse NIBBLE1, rendering the NIBBLE1 shorter, while the subsequent nibble NIBBLE2 is rendered longer by one tick, hence NIBBLE1 will be decreased by 1LSB, while NIBBLE2 is increased by 1LSB.

Errors as in cases G and H alike may only to some extend be detectable using by protocol using timing checks. Such an error may only to some extent be detected using a length check with consecutive nibble pulses. Within some limits multi-bit errors within nibbles comprised in the data grouping may still be correctly decoded at the receiving interface 300. Detectability of multi-bit errors within individual nibbles may be increased using an alternating sign check sum as collective nibble indicia as was described above. The receiving interface 300 may therefore take appropriate action to either correct the received nibbles within the data message or data grouping, invalidate values corresponding to the received nibbles, request sending of a new data package, but is not limited thereto.

Figure 16A:
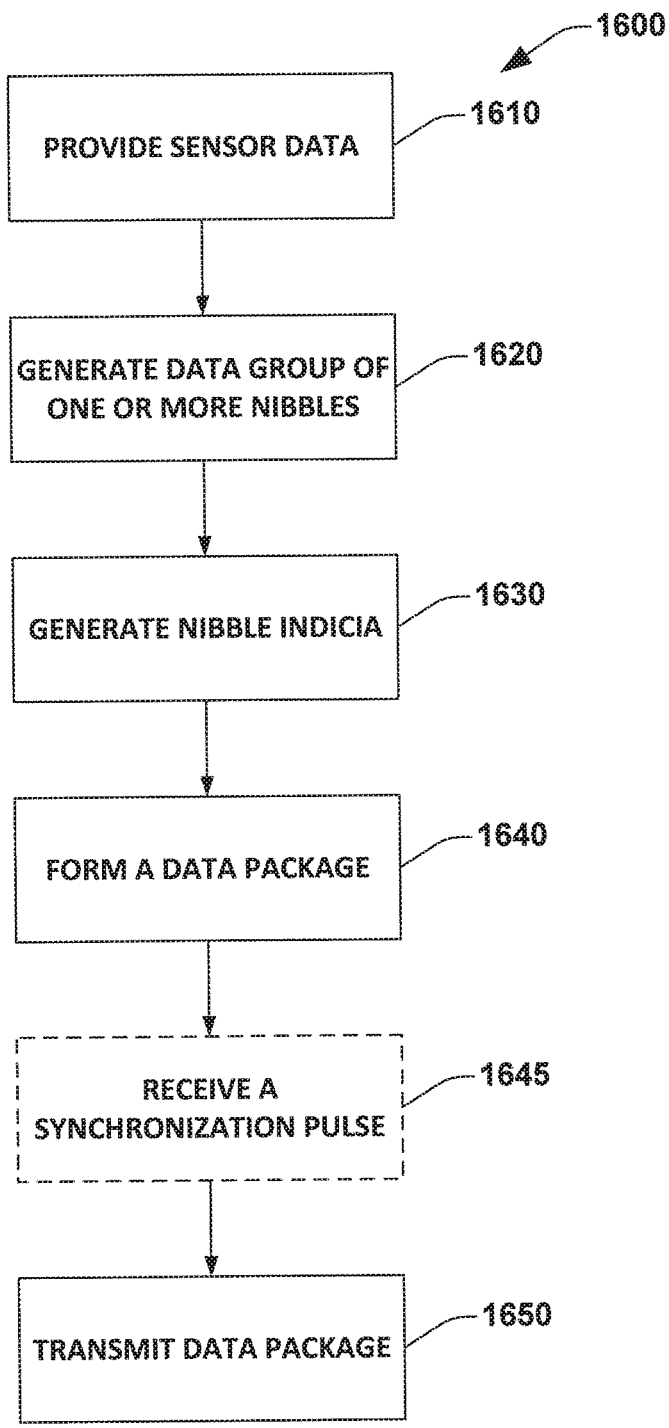
Figure 16B:
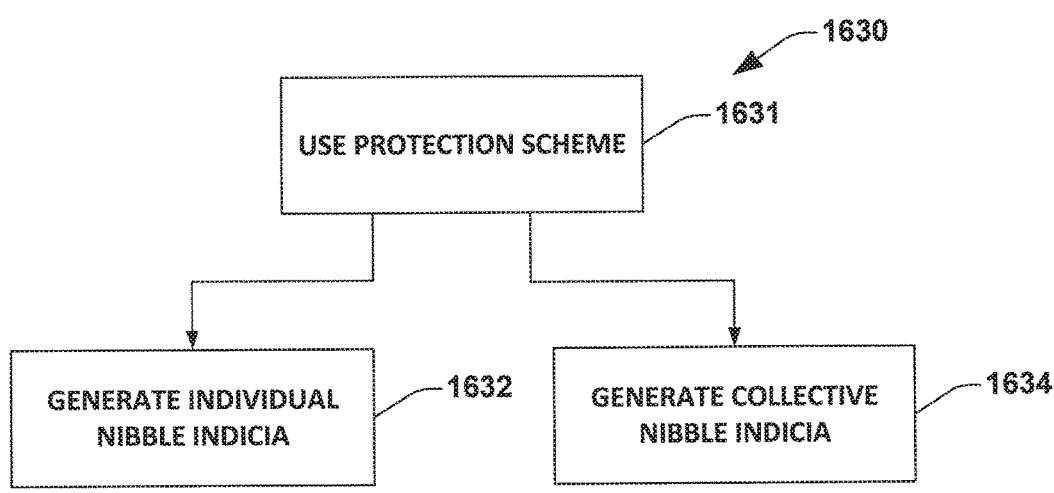

FIG. 16A and FIG. 16B illustrate a method 1600 for transmitting protected sensor data or sensor signals. A person of ordinary skill will readily appreciate that data protection as described within the present disclosure may be of interest in order to protect sensor signals transmitted using a PWM protocol, such as the SENT or SPC protocol.

The method 1600 of transmission further comprises a step 1610 of providing sensor data, wherein in one embodiment the sensor data may be provided in a digital format, for example as nibbles but not limited thereto.

The method further comprises a step 1620 of generating a data grouping comprising one or more nibbles representing values of individual sensor data. Without limitation one or more nibbles within the data grouping may represent portions of a sensor value.

The method 1600 may further comprise a step 1630 of generating a nibble indicia. As was explained before the nibble indicia may be an individual nibble indicia or a collective nibble indicia.

The method 1600 may further comprise a step 1640 forming a data package, namely data package 201 to be transmitted from the communication interface 200 of the sensor system 150 to the receiving interface 300 of the control unit or ECU 500 (see FIG. 14).

Following step 1640 of forming the data package 210, the data package 210 may be transmitted in a step 1650 over a line or a channel, as was described before.

The method 1600 may further comprise a step 1645 of receiving a synchronization pulse prior to the step 1650 of transmitting. In one embodiment, the synchronization pulse is a synchronization signal that comprises an addressing delay selectable to indicate an operating mode of the sensor; or is selectable to addressing an individual sensor out of a plurality of sensors communicatively coupled to the communication interface. In another embodiment, the synchronization signal comprises selectable delay.

FIG. 16B illustrates further aspects of step 1630 of generating the nibble indicia. The step 1630 may comprise a step 1631 of using a certain protection scheme for creation of the nibble indicia. The generation of nibble indicia may be based on parity calculations, modulo-x sum calculations, mixed modulo-x and modulo-y sum calculations, as was explained before as combinations of a modulo-4 and modulo-16 sum calculation. Further a check sum, or in particular an alternating sign check sum may be used for generation of the nibble indicia.

The nibble generation may further comprise a step 1632 of creating an individual nibble indicia. The calculation of the nibble indicia may vary depending on the selected protection scheme. Alternatively the method may comprise a step 1634 of generating a collective nibble indicia. The collective nibble indicia may vary depending on the selected protection scheme. A person of ordinary skill will appreciate that the step 1630 of generating nibble indicia may alter from individual nibble indicia to collective nibble indicia depending on circumstances and requirements.

Although the invention has been illustrated and described with respect to one or more implementations, alterations and/or modifications may be made to the illustrated examples without departing from the spirit and scope of the appended claims.

The term "computer readable media" as used herein includes computer readable storage media and communication media. Computer readable storage media includes volatile and nonvolatile, removable and non-removable media implemented in any method or technology for tangible storage of information such as computer readable instructions or other data. Data stores or memory disclosed herein are examples of computer readable storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium, which can be used to store the desired information.

The term "computer readable media" may also include communication media. Communication media typically embodies computer readable instructions or other data that can be communicated in a "modulated data signal" such as a carrier wave or other transport mechanism and includes any information delivery media. The term "modulated data signal" may include a signal that has one or more of its characteristics set or changed in such a manner as to encode information in the signal.

One or more of the operations described can constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein Moreover, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A sensor system configured to communicate at least partially protected sensor data over a communication interface, the sensor system comprising:
    a sensor structure configured to ascertain a physical parameter and provide sensor data in a digital domain associated therewith;
    a communication interface circuit communicatively coupled to the sensor element, the communication interface configured to receive the sensor data and generate a data package for transmission over the communication interface from the received sensor data;
    wherein the data package comprises:
        a data grouping comprising one or more nibbles related to the sensor data; and
        a nibble indicia based on at least a portion of selected nibbles within the data grouping,
    wherein the nibble indicia is generated according to a protection scheme associated with the portion of the selected nibbles, and wherein the portion is selected solely from a Least Significant Bit (LSB) of the respective selected nibble, two LSBs of the respective selected nibble, or three LSBs of the respective nibble.

2. The sensor system according to claim 1, wherein the communication interface is configured to transmit the data package in response to receipt of a synchronization signal sent from a receiving interface, the receiving interface being configured to receive the data package.

3. The sensor system according to claim 2, wherein the synchronization signal comprises selectable delay.

4. The sensor system of claim 1, wherein the protection scheme is selectable from a parity check, a Cyclic Redundancy Check (CRC), a Hamming Code, a Turbo Code or a Low Density Parity Check (LDPC).

5. The sensor system of claim 4, wherein the nibble represents a three-bit value sensor data.

6. The sensor system of claim 5, wherein the communication interface is configured to append the nibble indicia at the end of the respective nibble.

7. The sensor system of claim 1, wherein the communication interface is configured to locate an individual nibble indicia for a selected nibble within the data grouping after the selected nibble, such that the individual nibble indicia is distinct from the selected nibble within the data package.

8. The sensor system of claim 1, wherein the communication interface is configured to locate a collective nibble indicia for the selected nibbles after the data grouping such that the collective nibble indicia is distinct from the data grouping.

9. The sensor system of claim 1, wherein the communication interface is configured to append the nibble indicia at the end of the respective nibble.

10. The sensor system of claim 1, wherein the nibble indicia is solely associated with a predetermined one or more data nibbles.

11. The sensor system of claim 1, wherein the data grouping comprises five nibbles.

12. The sensor system of claim 11,
wherein the nibble indicia is the difference between the modulo-16 sum of the first, the third and the fifth nibble of the data grouping and the modulo-16 sum of the second, the fourth and the fifth nibble of the data grouping; and
wherein the communication interface is configured to locate the nibble indicia after the data grouping such that the nibble indicia is distinct from the data grouping.

13. The sensor system of claim 11,
wherein the nibble indicia is the modulo-4 sum of all the nibbles in the data grouping appended with the difference between the modulo-4 sum of the first, the third and the fifth nibble and the modulo-4 sum of the second, the fourth and the fifth nibble of the data grouping; and
wherein the communication interface is configured to locate the nibble indicia after the data grouping such that the nibble indicia is distinct from the data grouping.

14. A sensor system configured to communicate at least partially protected sensor data over a communication interface, the sensor system comprising:
a sensor structure configured to ascertain a physical parameter and provide sensor data in a digital domain associated therewith;
a communication interface circuit communicatively coupled to the sensor element, the communication interface configured to receive the sensor data and generate a data package for transmission over the communication interface from the received sensor data;
wherein the data package comprises:
a data grouping comprising one or more nibbles related to the sensor data; and
a nibble indicia based on at least a portion of selected nibbles within the data grouping, and
wherein the nibble indicia is associated with at least a portion of the data grouping excluding at least one Most Significant Bit (MSB) of the nibbles in the data grouping.

15. A sensor system configured to communicate at least partially protected sensor data over a communication interface, the sensor system comprising:
a sensor structure configured to ascertain a physical parameter and provide sensor data in a digital domain associated therewith;
a communication interface circuit communicatively coupled to the sensor element, the communication interface configured to receive the sensor data and generate a data package for transmission over the communication interface from the received sensor data;
wherein the data package comprises:
a data grouping comprising one or more nibbles related to the sensor data; and
a nibble indicia based on at least a portion of selected nibbles within the data grouping, and
wherein the nibble indicia is associated with different number of LSBs of the nibbles in the data grouping.

* * * * *